(12) United States Patent
Maruta et al.

(10) Patent No.: US 12,514,524 B2
(45) Date of Patent: Jan. 6, 2026

(54) X-RAY IMAGING SYSTEM, X-RAY IMAGING METHOD, X-RAY IMAGING CONTROL APPARATUS, AND RECORDING MEDIUM

(71) Applicant: Konica Minolta, Inc., Tokyo (JP)

(72) Inventors: Yuuichi Maruta, Hino (JP); Koutarou Kanamori, Hachioji (JP); Nobuyuki Miyake, Yokohama (JP); Takeshi Saito, Hachioji (JP); Keisuke Koeda, Higashimurayama (JP)

(73) Assignee: KONICA MINOLTA, INC., Tokyo (JP)

( * ) Notice: Subject to any disclaimer, the term of this patent is extended or adjusted under 35 U.S.C. 154(b) by 393 days.

(21) Appl. No.: 18/330,534

(22) Filed: Jun. 7, 2023

(65) Prior Publication Data
US 2023/0404503 A1 Dec. 21, 2023

(51) Int. Cl.
*A61B 6/00* (2024.01)
*A61B 6/40* (2024.01)
*A61B 6/46* (2024.01)
(52) U.S. Cl.
CPC .......... *A61B 6/463* (2013.01); *A61B 6/4035* (2013.01); *A61B 6/482* (2013.01); *A61B 6/5205* (2013.01)

(58) Field of Classification Search
CPC ......... A61B 6/548; A61B 6/547; A61B 6/482; A61B 6/5217; A61B 6/4241; A61B 6/4405; A61B 6/566; A61B 6/4494; A61B 6/54; G01N 23/06
See application file for complete search history.

(56) References Cited

U.S. PATENT DOCUMENTS

2010/0123083 A1* 5/2010 Petrick ................ A61B 6/4283
378/189

FOREIGN PATENT DOCUMENTS

JP 2018192054 A 12/2018

* cited by examiner

*Primary Examiner* — Don K Wong
(74) *Attorney, Agent, or Firm* — CANTOR COLBURN LLP

(57) ABSTRACT

An X-ray imaging system capable of performing X-ray imaging by a dual-energy X-ray absorptiometry and general imaging is shown. The X-ray imaging system includes the following. An X-ray irradiation apparatus is capable of individually irradiating a plurality of X-rays having different energies. A portable X-ray detector images an X-ray image based on the X-rays emitted from the X-ray irradiation apparatus. An X-ray imaging control apparatus controls imaging of the X-ray image by the X-ray detector. The X-ray imaging control apparatus includes a hardware processor that determines whether or not a type of the X-ray detector is suitable for X-ray imaging by the dual-energy X-ray absorptiometry and a notification section configured to perform notification based on a determination result of the hardware processor.

16 Claims, 9 Drawing Sheets

FIG. 5

| IMAGING METHOD | SID (cm) | TUBE VOLTAGE (kV) | TUBE VOLTAGE (FORWARD PATH) | TUBE VOLTAGE (RETURN PATH) | SLIT WIDTH (cm) | FILTER | FILTER (FORWARD PATH) | FILTER (RETURN PATH) | NECESSARY PANEL SIZE |
|---|---|---|---|---|---|---|---|---|---|
| DXA IMAGING | 120 | – | 70 | 110 | 0.5 | – | Gd | Cu | 14×17 |
| STILL IMAGE IMAGING | 100 | 85 | – | – | – | – | – | – | 10×12 |
| DYNAMIC IMAGING | 100 | 85 | – | – | – | – | – | – | 10×12 |
| ... | ... | ... | ... | ... | ... | ... | ... | ... | ... |

T1

| FPD NUMBER | PULSE IRRADIATION POSSIBLE | BONE DENSITY MEASUREMENT POSSIBLE | SIZE | ... |
|---|---|---|---|---|
| 001 | YES | YES | 14 × 17 | ... |
| 002 | NO | NO | 10 × 12 | ... |
| 003 | YES | NO | 14 × 17 | ... |
| 004 | NO | NO | 14 × 17 | ... |
| 005 | ... | ... | ... | ... |

T2

X-RAY IMAGING SYSTEM, X-RAY IMAGING METHOD, X-RAY IMAGING CONTROL APPARATUS, AND RECORDING MEDIUM

REFERENCE TO RELATED APPLICATIONS

The present invention claims priority under 35 U.S.C. § 119 to Japanese Application No. 2022-097692, filed on Jun. 17, 2022, the entire contents of which being incorporated herein by reference.

TECHNICAL FIELD

The present invention relates to an X-ray imaging system, an X-ray imaging method, an X-ray imaging control apparatus, and a recording medium.

DESCRIPTION OF THE RELATED ART

Conventionally, a bone density measurement apparatus using a dual-energy X-ray absorptiometry (hereinafter also referred to as DXA method) has been a dedicated machine. The general imaging and the bone density measurement are performed by different apparatuses. Therefore, a patient needs to move between the apparatuses. There have been problems such as a burden on the patient due to the movement and deterioration of work efficiency of an engineer. It was necessary to prepare imaging rooms for general imaging and bone density measurement, respectively. This causes problems regarding lack of space and financial burdens for the imaging room.

Japanese Unexamined Patent Publication No. 2018-192054 proposes a bone density measurement apparatus using a cassette-type radiation detector (also referred to as a flat panel detector (FPD)). Thus, by replacing the cassette-type, general imaging and bone density measurement can be performed using the same measurement device. In this case, since derivation accuracy of the value of the bone density may decrease depending on the imaging condition or the imaging state, the derivation accuracy is evaluated from the imaging condition or the image after imaging and then displayed.

SUMMARY OF THE INVENTION

However, when the general imaging and the bone density measurement by the DXA method are performed using the same measurement device, the measurement device is not a device exclusively used for the bone density measurement. Therefore, a user may perform imaging by using a wrong imaging method. For example, the user performs imaging in a state of general imaging although the imaging order is for bone density measurement. In addition, since the cassette type FPD can be replaced, there is a possibility that an FPD which is not suitable for the bone density examination is loaded on an imaging table. Furthermore, there is a case where an X-ray image in a range required for bone density measurement cannot be acquired depending on the size of the FPD. Depending on the function or performance of the FPD, there are cases where accuracy required for pulse irradiation of X-rays or bone density measurement is not achieved and imaging for bone density measurement cannot be performed with high accuracy.

In addition, when the derivation accuracy of the bone density evaluated and displayed after imaging is not sufficient, re-imaging is performed, and unnecessary exposure occurs.

Therefore, an object of the present invention is to prevent imaging by the DXA method in a state unsuitable for imaging by the DXA method and to prevent a subject from being wastefully exposed to radiation.

To achieve at least one of the abovementioned objects, according to an aspect of the present invention, the X-ray imaging system capable of performing X-ray imaging by a dual-energy X-ray absorptiometry and general imaging, reflecting one aspect of the present invention including:
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not a type of the X-ray detector is suitable for X-ray imaging by the dual-energy X-ray absorptiometry, and
a notification section configured to perform notification based on a determination result of the hardware processor.

According to another aspect, an X-ray imaging system capable of performing X-ray imaging by a dual-energy X-ray absorptiometry and general imaging, the X-ray imaging system including:
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not an apparatus state of the X-ray irradiation apparatus is suitable for X-ray imaging by the dual-energy X-ray absorptiometry, and
a notification section configured to perform notification based on a determination result of the hardware processor.

According to another aspect, an X-ray imaging system capable of performing X-ray imaging by a dual-energy X-ray absorptiometry and general imaging, the X-ray imaging system including,
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not an irradiation condition of the X-ray irradiation apparatus is suitable for X-ray imaging by the dual-energy X-ray absorptiometry, and
a notification section configured to perform notification based on a determination result of the hardware processor.

According to another aspect, an X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method including:
   determining whether or not a type of the X-ray detector is suitable for X-ray imaging by the dual-energy X-ray absorptiometry, and
   notifying to perform notification based on a determination result of the determining.

According to another aspect, an X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method including:
   determining whether or not an apparatus state of the X-ray irradiation apparatus is suitable for X-ray imaging by the dual-energy X-ray absorptiometry, and
   notifying to perform notification based on a determination result of the determining.

According to another aspect, an X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method including:
   determining whether or not an irradiation condition of the X-ray irradiation apparatus is suitable for X-ray imaging by the dual-energy X-ray absorptiometry, and
   notifying to perform notification based on a determination result of the determining.

According to another aspect, a non-transitory recording medium storing a computer-readable program for a computer in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the program causing the computer to function as:
   a hardware processor that determines whether or not a type of the X-ray detector is suitable for X-ray imaging by the dual-energy X-ray absorptiometry, and
   a notification section configured to perform notification based on a determination result of the hardware processor.

According to another aspect, a non-transitory recording medium storing a computer-readable program for a computer in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the program causing the computer to function as:
   a hardware processor that determines whether or not an apparatus state of the X-ray irradiation apparatus is suitable for X-ray imaging by the dual-energy X-ray absorptiometry, and
   a notification section configured to perform notification based on a determination result of the hardware processor.

According to another aspect, a non-transitory recording medium storing a computer-readable program for a computer in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the program causing the computer to function as:
   a hardware processor that determines whether or not an irradiation condition of the X-ray irradiation apparatus is suitable for X-ray imaging by the dual-energy X-ray absorptiometry, and
   a notification section configured to perform notification based on a determination result of the hardware processor.

According to another aspect, an X-ray imaging control apparatus included in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and the X-ray imaging control apparatus that controls imaging of the X-ray image by the X-ray detector, the X-ray imaging control apparatus including:
   a hardware processor that determines whether or not a type of the X-ray detector is suitable for X-ray imaging by the dual-energy X-ray absorptiometry, and
   a notification section configured to perform notification based on a determination result of the hardware processor.

According to another aspect, an X-ray imaging control apparatus included in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and the X-ray imaging control apparatus that controls imaging of the X-ray image by the X-ray detector, the X-ray imaging control apparatus including:
   a hardware processor that determines whether or not an apparatus state of the X-ray irradiation apparatus is suitable for X-ray imaging by the dual-energy X-ray absorptiometry, and
   a notification section configured to perform notification based on a determination result of the hardware processor.

According to another aspect, an X-ray imaging control apparatus included in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies, a portable X-ray detector that images an X-ray image based on the X-rays emitted from the X-ray irradiation apparatus; and an X-ray imaging control apparatus that controls imaging of the X-ray image by the X-ray detector, the X-ray imaging control apparatus including:

a hardware processor that determines whether or not an irradiation condition of the X-ray irradiation apparatus is suitable for X-ray imaging by the dual-energy X-ray absorptiometry, and a notification section configured to perform notification based on a determination result of the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 5 is a diagram illustrating an imaging method management table.

DETAILED DESCRIPTION

Hereinafter, a radiation imaging system according to an embodiment of the present invention will be described with reference to the drawings. However, the scope of the invention is not limited to the disclosed embodiments. The radiation imaging system of the present embodiment is capable of not only X-ray imaging using a dual-energy X-ray absorptiometry but also general imaging. Hereinafter, the dual-energy X-ray absorptiometry is referred to as the DXA method.

Note that the DXA method is a method in which radiation of two types of energy (high kV and low kV) is applied to a portion to be measured, a bone and other soft tissues are distinguished, and only a component of the bone is measured.

The general imaging is still image imaging using one type of radiation.

Figure 1:
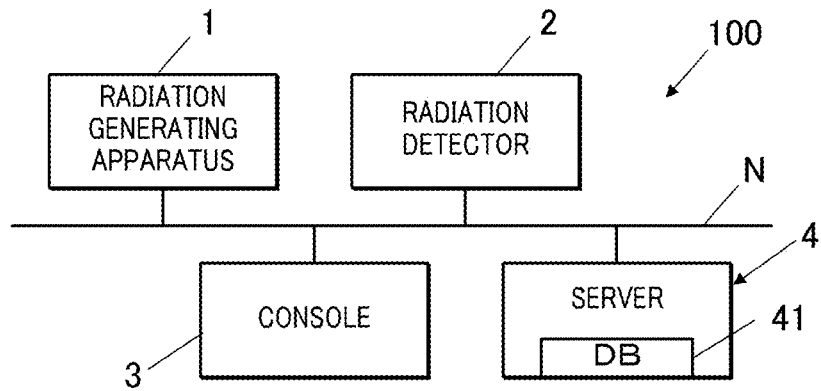
FIG. 1 is a block diagram illustrating a radiation imaging system according to an embodiment of the present invention.

A description is given of a schematic configuration of a radiographic system 100 according to the present embodiment. FIG. 1 is a block diagram illustrating the radiation imaging system 100.

As shown in FIG. 1, the radiation imaging system 100 of the present embodiment includes a radiation generating apparatus 1, a radiation detector 2, a console 3, and a server 4.

These components can communicate with each other via a communication network N.

Note that the radiation imaging system 100 (X-ray imaging system 100) may be connected to a hospital information system (HIS), a radiology information system (RIS), a picture archiving and communication system (PACS), an image analysis apparatus, and the like (not shown).

Figure 2:
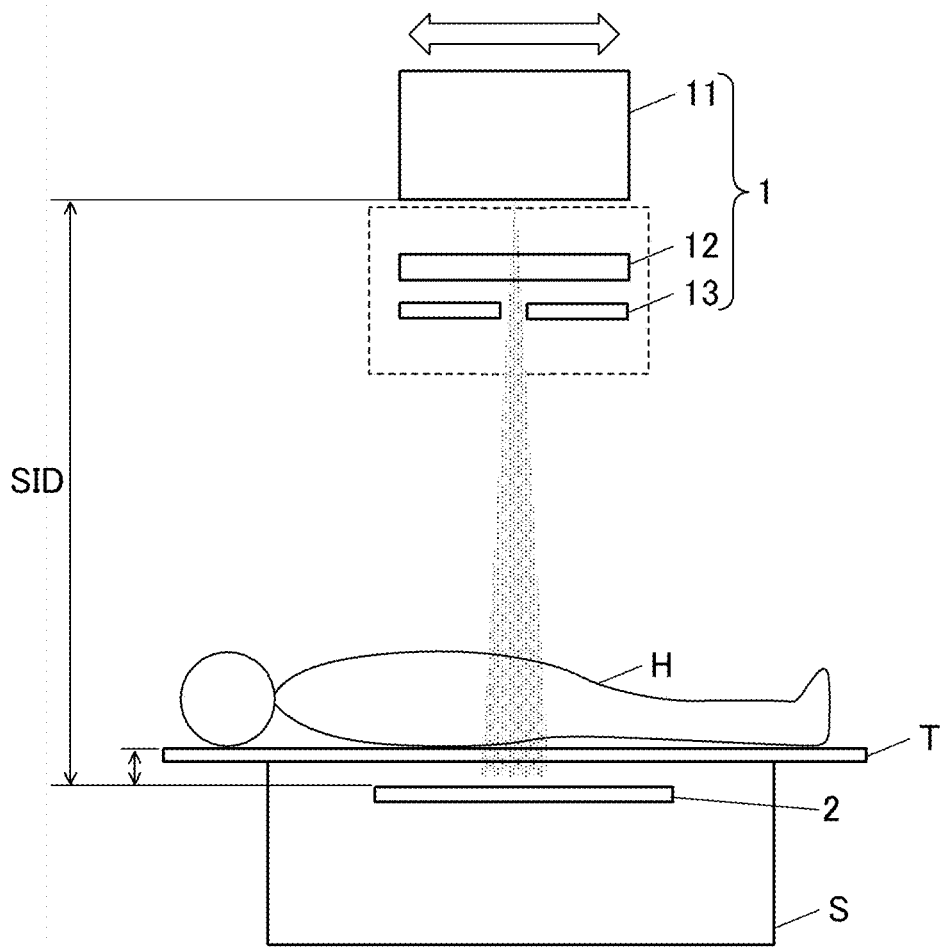
FIG. 2 is a schematic diagram illustrating a configuration example of a radiation generating apparatus and a radiation detector.

As illustrated in FIG. 2, the radiation generating apparatus 1 (X-ray irradiation apparatus) includes a generator that applies a voltage according to preset irradiation conditions, a radiation source 11 that generates radiation at a dose according to a tube current in a case in which a voltage is applied from the generator, a K-edge filter 12, a slit 13, and the like. These elements face a subject H and are arranged in the order of the slit 13, the K-edge filter 12, and the radiation source 11 from a subject H side. Examples of the irradiation conditions include a tube voltage, a tube current, an irradiation time, and a tube current-time product (mAs value). The radiation is, for example, X-rays.

Note that the apparatus state of the radiation generating apparatus 1 includes a source image receptor distance (SID) which will be described later, a slit width, and a filter type. The slit width is an opening width of the slit 13. The type of the filter is the type of the K-edge filter 12.

The radiation source 11 (tube) generates radiation in a mode corresponding to a radiation image to be captured.

The K edge filter 12 is a filter for absorbing X-rays in a middle range of the X-ray spectrum and separating energy of high-energy X-rays and low-energy X-rays. That is, the K-edge filter 12 functions as an energy separating unit. For example, Gd (gadolinium) or Cu (copper) is used for the K-edge filter 12.

The slit 13 is a mechanism for narrowing the X-ray irradiation range in order to reduce scattered radiation components that affect accuracy of bone density as much as possible. Note that the user sees a change over time in the bone density measurement. Therefore, the radiation imaging system 100 is required to have very high accuracy. Therefore, it is necessary to reduce the scattered ray component as much as possible. Examples thereof include a method of using a collimator provided in the radiation source 11 (tube) and a method of attaching a slit mechanism to the radiation source 11 externally.

Note that the radiation generating apparatus 1 may be installed in the imaging room. The radiation generating apparatus 1 may be incorporated in a mobile body called a medical cart together with the console 3 and the like.

Further, the K-edge filter 12 and the slit 13 may be externally attached to the radiation source 11. For example, the radiation source 11 may be provided with a loading unit for the K-edge filter 12 and the slit 13.

Although not shown in the drawings, the radiation detector 2 includes a radiation detection element or the like that receives radiation and generates an electric charge corresponding to the dose. The radiation detector 2 comprises a substrate or the like on which pixels comprising switch elements for accumulating and emitting electric charges are two dimensionally (in a matrix shape) arranged. The radiation detector 2 includes a scanning circuit or the like that switches ON/OFF of each switch element. The radiation detector 2 includes a readout circuit or the like that reads out the amount of charge emitted from each pixel as a signal value. The radiation detector 2 includes a controller that generates a radiation image from the plurality of signal values read by the reading circuit. The radiation detector 2 comprises an output unit or the like that outputs data or the like of the generated radiation image to the outside. The radiation detector 2 is also referred to as a flat panel detector (FPD).

Then, the radiation detector 2 generates a radiation image corresponding to the emitted radiation in synchronization with the timing at which the radiation is emitted from the radiation generating apparatus 1. The timing for synchronizing the timing at which radiation is emitted from the radiation generating apparatus 1 with the timing at which a radiation image is generated is an irradiation image generation synchronization timing. The irradiation image generation synchronization timing is generated by the radiation generating apparatus 1 and is transmitted to the radiation detector 2 through the communication network N described below. The radiation detector 2 generates the radiation image based on the irradiation image generation synchronization timing. Alternatively, the irradiation image generation synchronization timing is generated by the radiation detector 2 and is sent to the radiation generating apparatus 1 via the communication network N. The radiation generating apparatus 1 may irradiate radiation based on the irradiation image generation synchronization timing. The irradiation image generation synchronization timing may be transmitted using a cable for irradiation image generation synchronization timing separately from the communication network N. Further, the communication network N and the irradiation image generation synchronization timing cable may be integrated into one cable. Such cable is referred to as a communication network/irradiation image generation synchronization timing common cable.

Note that the radiation detector 2 (X-ray detector) may be an indirect-type radiation detector 2. The indirect type radiation detector 2 incorporates a scintillator or the like, converts the emitted radiation into light of another wavelength such as visible light by the scintillator, and generates charges corresponding to the converted light. The radiation detector 2 may be a direct-type radiation detector 2. The direct type radiation detector 2 generates charges directly from radiation without intervention of the scintillator or the like.

The radiation detector 2 is portable (cassette type). As shown in FIG. 2, the radiation detector 2 is mounted on an imaging table S.

In addition, the radiation detector 2 (cassette-type FPD) has typical sizes of 14×17 inch, 17×17 inch, and 10×12 inch.

In addition, in the present embodiment, the radiation detector 2 needs to be compatible with the imaging using the DXA method. Imaging by the DXA method is referred to as DXA imaging. In addition, for example, in a case where the radiation detector 2 performs imaging by moving the tube while narrowing the X-rays with a slit to be described later, the X-rays are pulse irradiation. Therefore, the radiation detector 2 needs to be an FPD that can be controlled in accordance with the pulse irradiation. An imaging method of performing imaging by moving the tube while narrowing the X-rays with the slit is referred to as slot imaging or the like. The control corresponding to the pulse irradiation is, for example, control for generating a radiation image in synchronization with the irradiation timing of the pulse irradiation.

The radiation detector 2 is managed using an FPD individual information management table T2 to be described later.

Furthermore, a distance between the radiation source 11 and the radiation detector 2 illustrated in FIG. 2 is referred to as a source image receptor distance (SID). To be precise, the source is a focal point of the radiation source 11 that is the tube. To be precise, the image receptor is an image receiving surface of the radiation detector 2 (FPD). Therefore, accurately, the SID is a focal point-FPD distance.

The console 3 serves as an image processing apparatus or an electronic apparatus, and is constituted by a PC, a dedicated apparatus, or the like.

Further, the console 3 can set various imaging conditions in the imaging apparatus or the like based on imaging order information acquired from another system such as the HIS or the RIS or an operation by the user. The imaging conditions include a tube voltage, a tube current, an irradiation time, a tube current-time product (mAs value), a frame rate, the physique of the subject H, the presence or absence of a grid, and the like.

Figure 3:
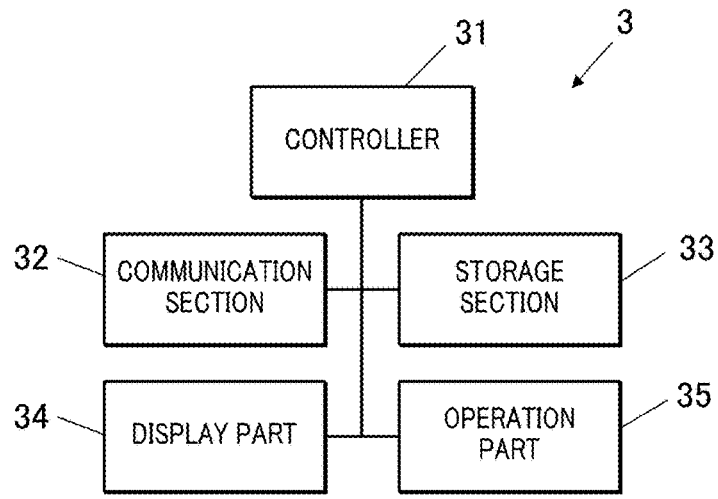
FIG. 3 is a block diagram illustrating a console included in the radiographic system.

As shown in FIG. 3, the console 3 according to the present embodiment includes a controller 31 (hardware processor), a communication section 32, a storage section 33, a display part 34, and an operation part 35.

Each of the units 31 to 35 is electrically connected by a bus.

The controller 31 includes a central processing unit (CPU), a random access memory (RAM), and the like.

The CPU of the controller 31 reads various programs stored in the storage section 33, develops the programs in the RAM, executes various processes in accordance with the developed programs, and centrally controls the operation of each unit of the console 3.

Note that the controller 31 functions as a determination section which determines whether or not a type of the radiation detector 2, the apparatus state of the radiation generating apparatus 1, and the irradiation conditions of the radiation generating apparatus 1 are suitable for X-ray imaging by the dual-energy X-ray absorptiometry.

The controller 31 also functions as a first prohibition section that prohibits imaging when the size, function, or performance of the radiation detector 2 is not a size, function, or performance suitable for X-ray imaging by dual-energy X-ray absorptiometry.

In addition, the controller 31 functions as a second prohibition section that prohibits imaging in a case in which the slit and/or the K edge filter that narrows the X-ray irradiation range is not suitable for the DXA imaging.

The controller 31 also functions as a third prohibition section that prohibits imaging when the distance between the radiation generating apparatus 1 and the object (subject H) is outside a predetermined range.

The communication section 32 is constituted by a communication module or the like.

The communication section 32 transmits and receives various signals and various data to and from another device or the like connected via a communication network N (a local area network (LAN), a wide area network (WAN), the Internet, or the like).

The storage section 33 is formed with a nonvolatile semiconductor memory, a hard disk, or the like.

The storage section 33 stores various programs to be executed by the controller 31, parameters required for executing the programs, and the like.

Note that the storage section 33 may be capable of storing a radiation image. In addition, the storage section 33 may be capable of storing information related to the imaging method in an imaging method management table T1 to be described later and individual information of the FPD in an FPD individual information management table T2 to be described later.

The display part 34 includes a display device that displays an image, such as a liquid crystal display (LCD) or a cathode ray tube (CRT), a lamp (such as an LED) that emits light, a speaker that outputs sound, a vibrator that vibrates, and the like.

Note that the display part 34 functions as a notification section which makes a notification based on the determination result of the controller 31.

The operation part 35 includes a keyboard including cursor keys, numeric input keys, various function keys, and the like, a pointing device such as a mouse, a touch panel layered on a surface of a display device, and the like.

Next, the operation part 35 outputs a control signal corresponding to an operation performed by the user to the controller 31.

Figure 4:
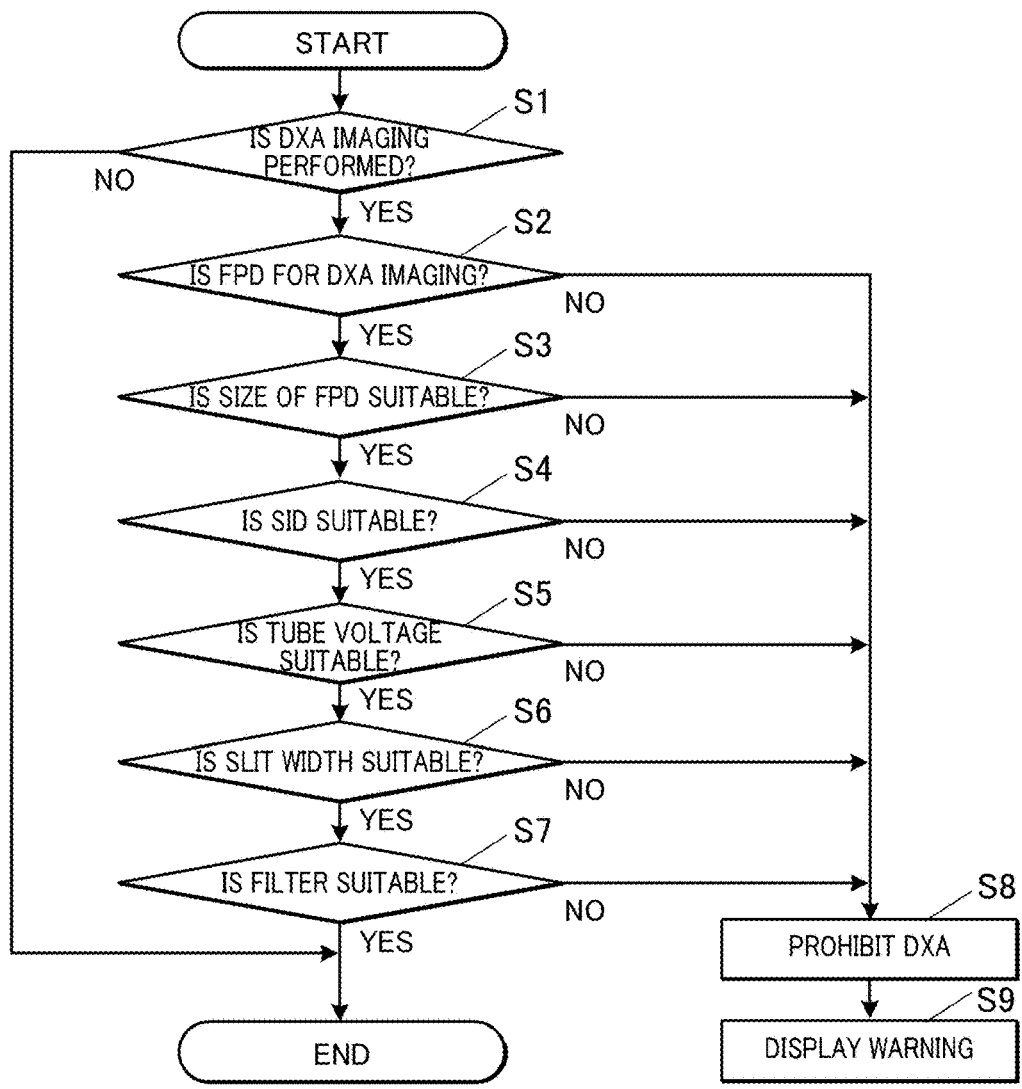
FIG. 4 is a flowchart showing the imaging possibility determination processing by the DXA method executed by the console.

The controller 31 of the console 3 configured as described above has a function of executing processing that determines possibility of imaging by the DXA method as shown in FIG. 4. Such imaging possibility determination processing is executed, for example, in response to loading of the radiation detector 2 onto the imaging table S. Such processing that determines possibility of imaging by the DXA method as shown in FIG. 4 is referred to as a DXA imaging possibility determination processing.

The server 4 is configured by a PC, a dedicated device, a virtual server on a cloud, or the like.

Further, the server 4 includes a database 41.

The database 41 stores an imaging method management table T1 and an FPD individual information management table T2. The imaging method management table T1 stores information on an imaging method. The individual information of the FPD is stored in the FPD individual information management table T2.

Here, the imaging method management table T1 shown in FIG. 5 will be described. The imaging method management table T1 is a table for managing information relating to imaging for each imaging method. The information (imaging information) related to imaging is patient information and examination information. For example, the imaging information includes an SID, a tube voltage, a slit width, a filter, a necessary panel size, and the like corresponding to the imaging method.

Next, the FPD individual information management table T2 shown in FIG. 6 will be described. The FPD individual information management table T2 is a table for managing individual information for each FPD. Examples of the individual information include functions such as whether or not pulse irradiation is possible and whether or not bone density measurement is possible, performance such as a pixel size and a compatible frame rate, and a panel size. The type of the radiation detector 2 described later is a combination of column names of the FPD individual information management table T2. The possibility of DXA imaging is classified according to the type of the radiation detector 2.

Note that in the present embodiment, the database 41 is provided in the server 4 which is independent of the console 3 and the like. However, the database 41 may be provided in the console 3. The database 41 may be provided in another apparatus included in the radiation imaging system 100.

In a case where another system such as a PACS is connected to the radiation imaging system 100, the database 41 may be provided in the other system.

The radiation imaging system 100 according to the present embodiment configured as described above can image a radiation image of the subject H by irradiating the subject H with radiation from the radiation source. The subject H is disposed between the radiation source of the radiation generating apparatus 1 and the radiation detector 2 which are disposed to face each other.

In a case in which the radiation image is a still image, the emission of radiation and the generation of the radiation image are performed only once for one imaging operation. In a case in which the radiation image is a moving image, the emission of pulsed radiation and the generation of a frame image are repeated a plurality of times for a short time for one imaging operation. The plurality of times in a short time is, for example, 15 times per second. Imaging in a case in which the radiation image is a still image is referred to as still image imaging or general imaging. Imaging in a case where the radiation image is a moving image is referred to as dynamic imaging or serial imaging.

In imaging by the DXA method, scan imaging is performed by linearly moving the radiation source 11 as indicated by an arrow illustrated in FIG. 2. In imaging by the DXA method, scan imaging is performed by moving the irradiation range narrowed by the slit 13 with respect to the subject H.

In the DXA method, X-rays of two different types of energy, i.e., high energy and low energy, are irradiated, and the bone density is measured based on the difference in absorptivity between bone and soft tissue. Therefore, for example, in the forward path, the tube voltage of the radiation source 11 is set as 70 kV, the K edge filter 12 is set as Gd, and the scan imaging is performed. In the return path, the tube voltage of the radiation source 11 is set as 110 kV, the K-edge filter 12 is set as Cu, and the reciprocating scan imaging is performed.

Furthermore, the scan imaging may be a method of performing unidirectional scan imaging while switching a tube voltage of the radiation source 11 or the K edge filter 12 for each irradiation range.

Furthermore, the radiation source 11 performs pulse irradiation for each irradiation range. This is because if the imaging range is exposed in one occasion, the effect of scattered radiation increases and the accuracy of bone density is affected. Therefore, the radiation source 11 can reduce the influence of scattered radiation by performing pulse irradiation for each irradiation range narrowed by using the slit.

The irradiation range on the radiation detector 2 is determined by the width of the slit 13 and the SID.

Next, the DXA imaging possibility determination processing will be described with reference to the flowchart of FIG. 4. The DXA imaging possibility determination processing is processing in which the controller 31 determines whether or not the radiation imaging system 100 is in a state in which DXA imaging is possible. It is assumed that the operation part 35 is operated by an imaging person who is a user, and the input of the patient information and the examination information of the subject H is already performed. The imaging executor is a radiographer.

The setting of the radiation generating apparatus 1 may be automatically performed based on the imaging method management table T1. For example, in the case of the SID, the SID is set by automatic movement of a device, such as an arm, for fixing the radiation source 11. Further, for example, in the case of the tube voltage, the tube voltage scheduled to be applied to the radiation source 11 is automatically set. Since both the general imaging and the DXA can be performed by one apparatus in this apparatus, there is a possibility that the user erroneously applies the imaging conditions such as the SID and the tube voltage for the general imaging to the DXA imaging. However, according to the present invention, it is possible to reduce human error.

First, the controller 31 determines whether or not the imaging to be performed is the DXA imaging from the imaging order information acquired from the RIS or the like when the user starts the examination (step S1). If it is the DXA imaging (step S1; YES), the DXA imaging possibility determination processing proceeds to step S2. If it is not the DXA imaging (step S1; NO), the DXA imaging possibility determination processing ends.

Next, the controller 31 determines, based on the individual information on the FPD stored in the database 41, whether the FPD loaded on the imaging table S by the imaging person can be used for DXA imaging (step S2). If DXA imaging is possible (step S2; YES), the DXA imaging possibility determination processing proceeds to step S3. If DXA imaging is not possible (step S2; NO), the DXA imaging possibility determination processing proceeds to step S8.

Figures 6, 7:
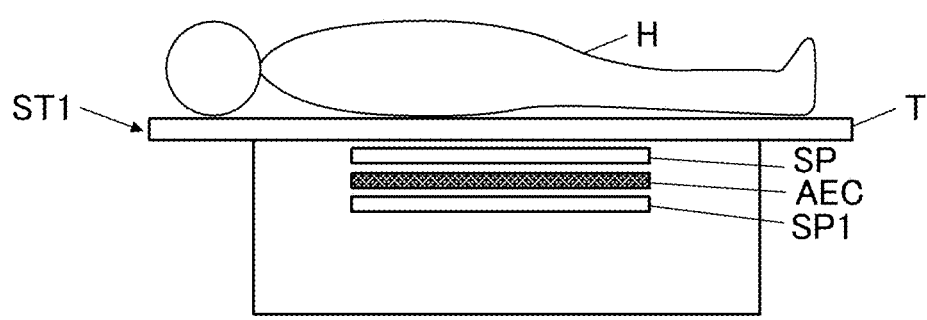
FIG. 6 is a diagram illustrating an FPD individual information management table.
FIG. 7 is a schematic diagram (side view) of a decubitus imaging table for general imaging.

To be specific, the controller 31 determines that the FPD is an FPD for DXA imaging in a case where both the pulse irradiation and the bone density measurement are shown to be possible in the FPD individual information management table T2 illustrated in FIG. 6.

Note that instead of the determination using the FPD individual information management table T2, information on whether or not DXA imaging is possible may be stored in each FPD, and the determination may be performed based on that information. The information indicating whether DXA imaging is possible is information indicating that both general imaging and DXA imaging are possible. Alternatively, the information on whether or not DXA imaging is possible is information indicating that DXA imaging is not possible or information indicating that only general imaging is possible.

Next, the controller 31 determines, based on the individual information on the FPD stored in the database 41, whether the size of the FPD loaded on the imaging table S by the person performing the imaging is appropriate (step S3). When the size is appropriate (step S3; YES), the DXA imaging possibility determination processing proceeds to step S4. When the size is not appropriate (step S3; NO), the DXA imaging possibility determination processing proceeds to step S8.

To be specific, the controller 31 makes the determination using the necessary panel size of the imaging method management table T1 illustrated in FIG. 5 and the size of the FPD individual information management table T2 illustrated in FIG. 6. For example, as shown in the required panel size of the imaging method management table T1 shown in FIG. 5, the region to be imaged by DXA imaging is often the lumbar vertebrae or the femoral bones. Therefore, it is conceivable that the size is insufficient if the size is 10×12. Therefore, there is a case where imaging is not permitted when an FPD whose size shown in the FPD individual information management table T2 is 10×12 is loaded.

Next, the controller 31 calculates the SID based on position information of a device (not shown) for fixing the radiation source 11, such as an arm. Then, the controller 31 determines whether the SID is a desired SID set for DXA imaging based on the imaging method management table T1 (step S4). In a case in which the SID is appropriate (step S4; YES), the DXA imaging possibility determination processing proceeds to step S5. If the SID is not appropriate (step S4; NO), the DXA imaging possibility determination processing proceeds to step S8.

To be specific, the controller 31 determines whether or not the calculated SID is a distance within a predetermined range from the SID of the DXA imaging in the imaging method management table T1 shown in FIG. 5. The SID of the DXA imaging is 120 cm in FIG. 5. In a case where the SID is automatically set based on the imaging method management table T1, step S4 may not be executed. Even in a case where the SID is automatically set, step S4 may be executed in a case where it is detected that the SID is manually changed after the automatic setting. By doing so, even in a case where the automatic operation and the manual operation are mixed, the discrimination can be reliably performed.

Next, the controller 31 determines whether the tube voltage applied to the radiation source 11 is the desired tube voltage set for the DXA imaging based on the imaging method management table T1 (step S5). When the tube voltage is appropriate (step S5; YES), the DXA imaging possibility determination processing proceeds to step S6. When the tube voltage is not appropriate (step S5; NO), the DXA imaging possibility determination processing proceeds to step S8.

To be more specific, the controller 31 determines whether the set tube voltage is equal to the tube voltage in the imaging method management table T1 shown in FIG. 5. In a case where the tube voltage is automatically set based on the imaging method management table T1, step S5 may not be executed. Even in a case where the tube voltage is automatically set, step S5 may be executed in a case where it is detected that the tube voltage is manually changed after the automatic setting. By doing so, even in a case where the automatic operation and the manual operation are mixed, the determination can be reliably performed.

The controller 31 may determine whether the tube voltage is a voltage within a predetermined range suitable for DXA imaging.

Next, the controller 31 determines whether the width of the slit 13 loaded by the imaging person is equal to a desired slit width set for DXA imaging (step S6). When the slit width is appropriate (step S6; YES), the DXA imaging possibility determination processing proceeds to step S7. When the slit width is not appropriate (step S6; NO), the DXA imaging possibility determination processing proceeds to step S8.

To be specific, the controller 31 determines whether the width of the loaded slit 13 is equal to the slit width in the imaging method management table T1 shown in FIG. 5.

Note that the controller 31 may determine whether the slit width is a width within a predetermined range suitable for the DXA imaging.

Next, the controller 31 determines whether the K-edge filter 12 loaded by the imaging person is a desired filter set for the DXA imaging (step S7). In a case where the filter is appropriate (step S7; YES), the DXA imaging possibility determination processing ends. When the filter is not appropriate (step S7; NO), the DXA imaging possibility determination processing proceeds to step S8.

To be more specific, the controller 31 determines whether or not the loaded K-edge filter 12 is equal to the filter of the imaging method management table T1 shown in FIG. 5.

Note that in a case where the slit 13 and the K edge filter 12 are not externally attached to the radiation source 11, the DXA imaging possibility determination processing may proceed to step S8.

Next, the controller 31 prohibits imaging (step S8). Prohibiting imaging means that a user is not permitted to perform imaging.

Next, the controller 31 displays a warning on the display part 34 (step S9). The warning display is provided by notifying a message, a sound, a vibration, or the like corresponding to the content of steps S1 to S7 as appropriate. For example, the message is "DXA imaging is not permitted", "cassette FPD unsuitable for DXA imaging is loaded", "SID is unsuitable" or the like. The controller 31 may display an icon indicating NG before the message and display a message indicating a reason for NG when the icon is pressed. Conversely, when all the conditions required for DXA are satisfied, the controller 31 may display a message such as "DXA imaging is possible" or may display an icon indicating it. Thus, the user is clearly notified that all the conditions required for the DXA are satisfied.

The present invention is not limited to the case where the warning is displayed after the imaging is prohibited, and the setting may be made such that only the imaging is prohibited (step S8) or only the warning is displayed (step S9).

Other Modification Examples (Photographing Allowance/Warning)

Note that if the SID is made other than the predetermined SID at the time of the DXA imaging as described above in step S4, the controller 31 issues a warning and/or does not allow imaging in step S8. However, the controller 31 may permit imaging at the time of general imaging.

Furthermore, a configuration may be adopted in which the SID setting for automatic tracking can be set by the user in the case of the general imaging and cannot be set by the user in the case of the DXA imaging. The auto tracking is that the radiation imaging system 100 automatically sets the SID. For example, at the time of DXA imaging, the radiation imaging system 100 fixes the SID set by auto tracking so that the SID cannot be changed. In this case, step S4 may not be performed. Since the SID has a fixed length in DXA imaging, this can prevent a user from erroneously setting the SID to a value other than the predetermined distance.

Furthermore, the controller 31 may permit arbitrary switching of the additional filter by the user in the general imaging and may not permit the switching of the filter in the DXA imaging. This is because a specific filter (K-edge filter 12) used for energy separation at the time of the DXA imaging is determined. On the other hand, in the general imaging, the user can select which additional filter to use. Therefore, when a filter that is not suitable for DXA imaging as a habit of general imaging is used, accuracy in measurement of bone density is not achieved. For example, the controller 31 issues a warning and/or does not allow imaging in steps S8 and S9 when the filter is switched during DXA imaging. Furthermore, for example, in general imaging, the controller 31 does not allow selection of the special filter for DXA imaging or issues a warning and/or does not allow the imaging if the special filter for DXA imaging is selected.

As described above, a specific filter is determined at the time of DXA imaging, and there is no room for selection by a user. Therefore, the controller 31 may not display the change icon for filter switching on the UI at the time of DXA imaging. Furthermore, the controller 31 may gray out the change icon so that the change icon is not selectable.

In addition, a filter specific to the DXA imaging is not used at the time of general imaging. Therefore, the controller 31 may exclude the filter specific for DXA imaging from the display at the time of selection so that the filter is not erroneously selected. By doing so, it is possible to prevent the user from erroneously changing the filter to a filter other than the predetermined filter.

Furthermore, the controller 31 may add a step in the DXA imaging possibility determination processing. To be specific, the controller 31 may determine whether or not the angle is appropriate from the angle information (+ panel angle) of the tube before the start of the DXA imaging and may issue a warning and/or prohibit the exposure in steps S8 and S9. A case where the tube is inclined depending on the previous imaging state is also considered. Therefore, by adding the above-described step, it is possible to prevent imaging from being started at an angle other than the predetermined angle, which results in unnecessary imaging.

Furthermore, the controller 31 may add a step in the DXA imaging possibility determination processing. Specifically, the controller 31 may issue a warning and/or prohibit imaging when the table T (top plate T) of the imaging table S is different from a predetermined one. It is up to the user which imaging table the panel is loaded on. For this reason, there is a possibility that the panel is erroneously mounted on the imaging table which is not compatible with DXA. However, by adding the above steps, the user notices the panel loading error before imaging.

When the panel is connected to the I/F cable, the controller 31 may read a unique ID to determine which imaging table the panel is loaded on. The unique ID is written in an I/F cable between the imaging table and the panel attached to the imaging table. The unique ID is linked to the type of imaging table. The controller 31 can determine whether or not the imaging table supports DXA from the type of the imaging table.

Further, the controller 31 may turn off auto exposure control (AEC) at the time of DXA imaging. This is because the AEC uses power near the panel and thus may be a noise source. This is also because the noise component may affect the result of the bone density. By doing so, it is possible to avoid the influence of the disturbance of the AEC.

Further, the controller 31 may allow the user to turn ON/OFF the AEC during general imaging and may not allow the user to turn ON/OFF the AEC during DXA imaging. Doing so makes it possible to avoid a situation in which a user erroneously turns the AEC on in the DXA imaging and a desired result cannot be obtained for bone density.

Here, the AEC will be described. In general imaging, the AEC is useful for reducing the burden on the person who performs the imaging because it automatically derives irradiation conditions corresponding to the subject. However, in the DXA imaging, X-rays that have passed through the subject are incident on the AEC and generate scattered rays, and therefore it is desirable that the AEC be not located between the subject and the FPD.

In general, the AEC is most used for chest imaging, and most of the chest imaging is performed using an upright imaging table. Therefore, in the X-ray imaging system that supports both the DXA imaging and the general imaging, the AEC may not be provided in the decubitus imaging table that performs DXA imaging, and the AEC may be provided in the imaging table that does not support the DXA imaging. The imaging table that does not support DXA imaging is, for example, the upright imaging table.

Further, in a case where there are three or more imaging tables including the upright imaging table and the decubitus imaging table, one of the imaging tables may be made to correspond to the DXA imaging, and at least the imaging table may not be provided with the AEC, and the other imaging tables may be provided with the AEC. For example, in a case where there are two decubitus imaging tables and one upright imaging table, one of the decubitus imaging tables is used for the DXA imaging and the AEC is not provided, and the AEC is provided for the other decubitus imaging table and the upright imaging table. With this, it is possible to achieve both the convenience of the DXA imaging and the convenience of the general imaging.

However, in this case, if the DXA imaging is performed on the decubitus imaging table provided with the AEC, scattered radiation is generated by the AEC. Therefore, in a case where the imaging table selected by the person who performs the imaging in the DXA imaging is the imaging table provided with the AEC, the controller 31 may issue a warning and/or may reject exposure in step S8 and S9. Such a step may be added to the DXA imaging possibility determination processing. Alternatively, the condition that the imaging table that is not provided with the AEC is selected may be used as one of the DXA imaging permission conditions.

The above-described X-ray imaging system 100 avoids the effect of scattered radiation due to AEC during DXA imaging by providing the imaging table S that is not provided with AEC. However, it is also possible to avoid the influence of scattered radiation by devising the arrangement of the AEC and the radiation detector 2 of the imaging table S.

Normally, as illustrated in FIG. 7, a decubitus imaging table ST1 used for general imaging has a grid space SP (grid slot) into which a grid can be inserted under a top plate T on which a patient is placed. The AEC is arranged thereunder. Further, there is a first FPD space SP1 (FPD tray) under which the radiation detector 2 can be inserted. The user can take in and out the radiation detector 2 from the first FPD space SP1. Specifically, the user pulls out the FPD tray from the imaging table, sets and fixes the radiation detector 2 on the tray, and pushes the tray into the imaging table. The procedure is reverse when removed.

Figure 8:
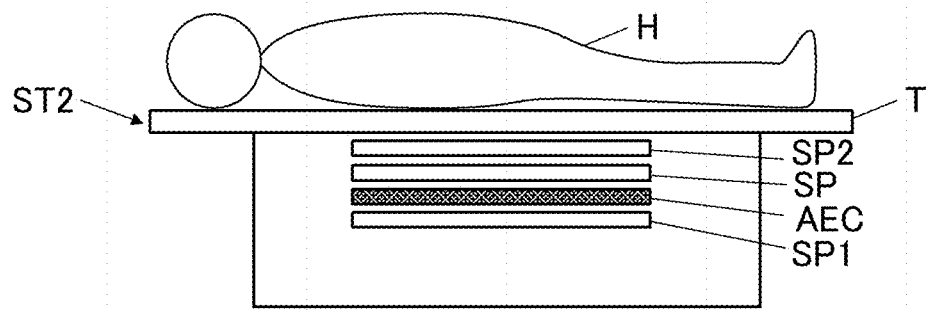
FIG. 8 is a schematic view (side view) of a DXA-compatible decubitus imaging table.

In contrast, as illustrated in FIG. 8, the second FPD space SP2 into which the radiation detector 2 can be inserted may be further provided under the top plate T on which the patient is placed. That is, at the time of DXA imaging, the DXA-compatible decubitus imaging table ST2 may be used in which the radiation detector 2 is inserted into the second FPD space SP2 to perform imaging. In the DXA-compatible decubitus imaging table ST2, since there is no AEC between the patient (subject H) and the radiation detector 2, the influence of scattered radiation caused by the AEC can be avoided. The second FPD space SP2 may be provided between the grid space SP and the AEC.

Figure 9:
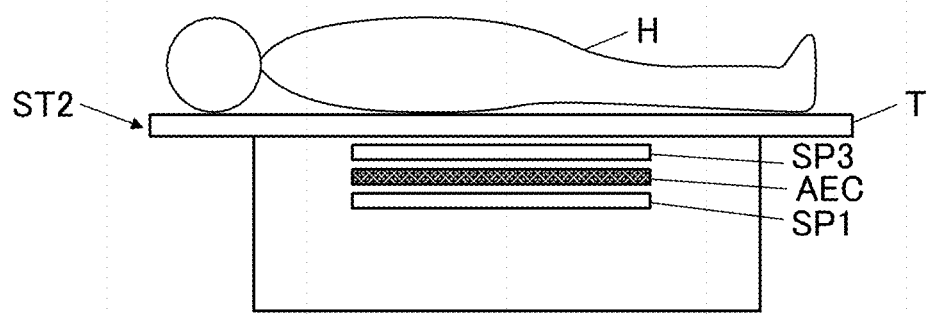
FIG. 9 is a schematic view (side view) of the DXA-compatible decubitus imaging table.

Alternatively, as shown in FIG. 9, the grid space SP may be shared with the second FPD space SP2 (shared space SP3), and the grid or the radiation detector 2 may be inserted into the grid space SP.

Figure 10:
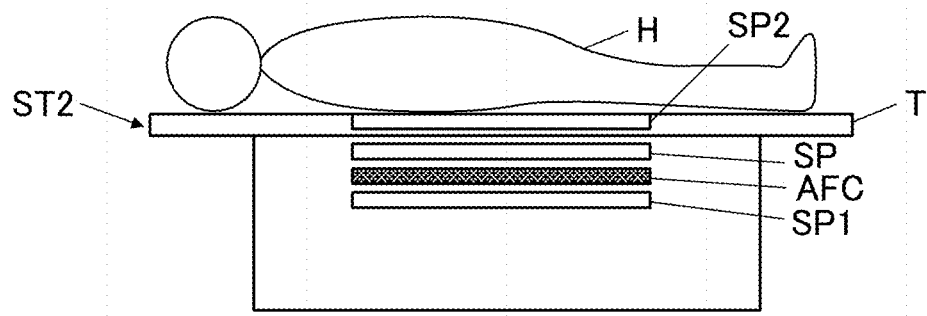
FIG. 10 is a schematic diagram (side view) of the DXA-compatible decubitus imaging table.
Figure 11:
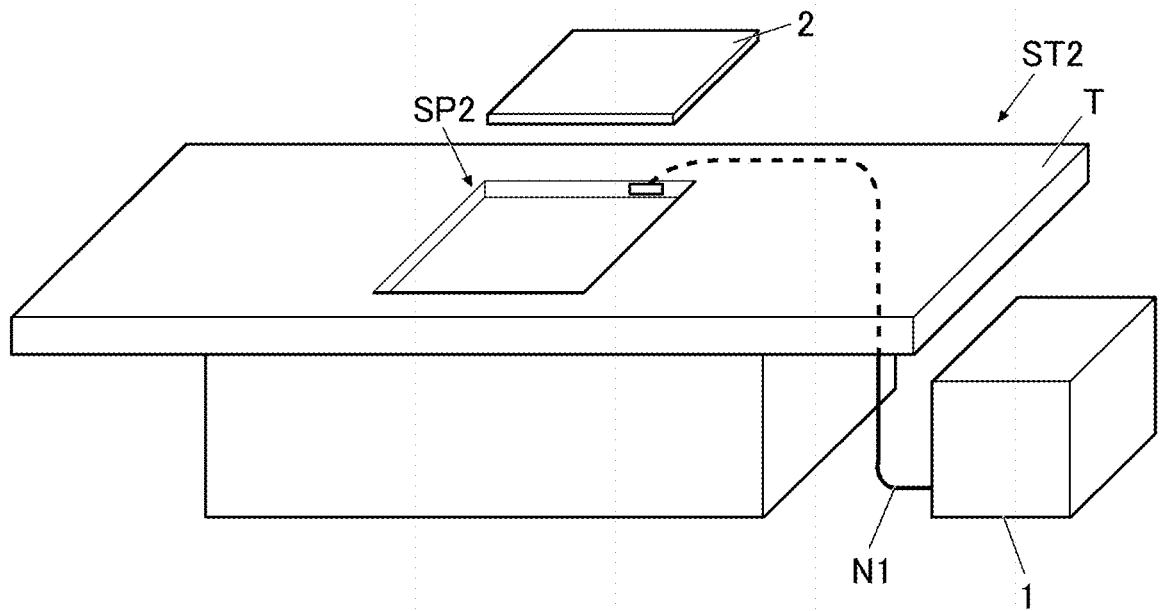
FIG. 11 is a schematic view (perspective view) of the DXA-compatible decubitus imaging table.
Figure 12:
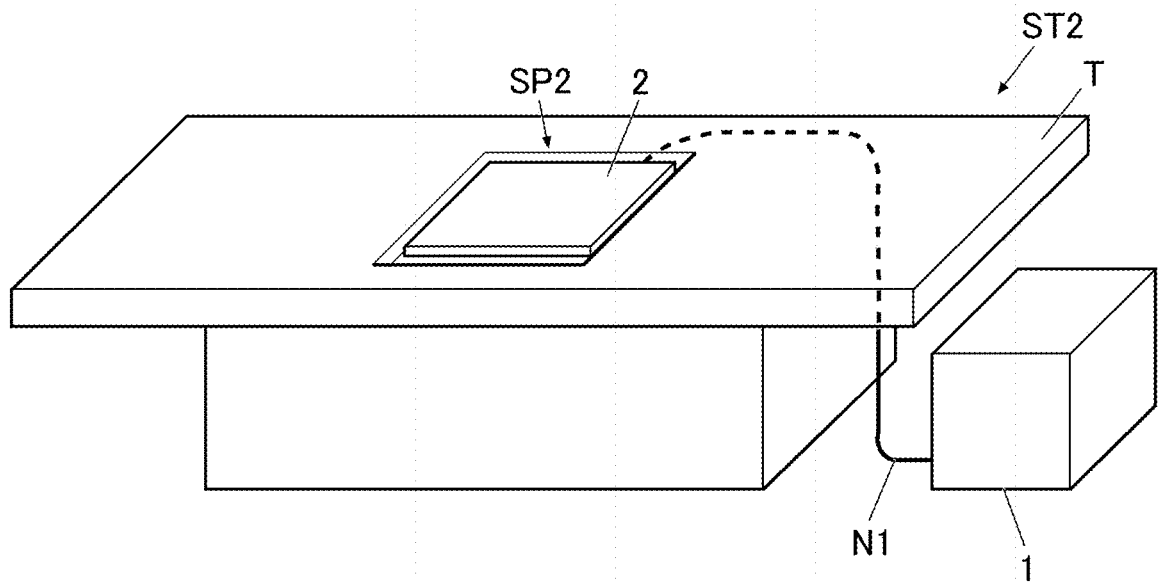
FIG. 12 is a schematic view (perspective view) of the DXA-compatible decubitus imaging table.

Alternatively, as illustrated in FIG. 10, a second FPD space SP2 may be provided in the upper portion of the top plate T on which the patient is placed. When the second FPD space SP2 is provided in the upper portion of the top plate T, as shown in FIG. 11, a rectangular recess into which the radiation detector 2 can be fitted is provided in the central portion of the top plate T. The radiation detector 2 used for the DXA is housed in the recess as shown in FIG. 12.

As illustrated in FIG. 11, an interface used to connect the communication network N with the radiation detector 2, an interface for an irradiation image generation synchronization timing, and a power supply interface are provided in the second FPD space SP2. The radiation detector 2 is stored in this space, and the radiation detector 2 is connected to these interfaces. These interfaces may be separated from each other. A plurality of interfaces may be integrated into one cable connector CN as in a communication network/irradiation image generation synchronization timing common cable N1 of FIG. 11.

Figure 13:
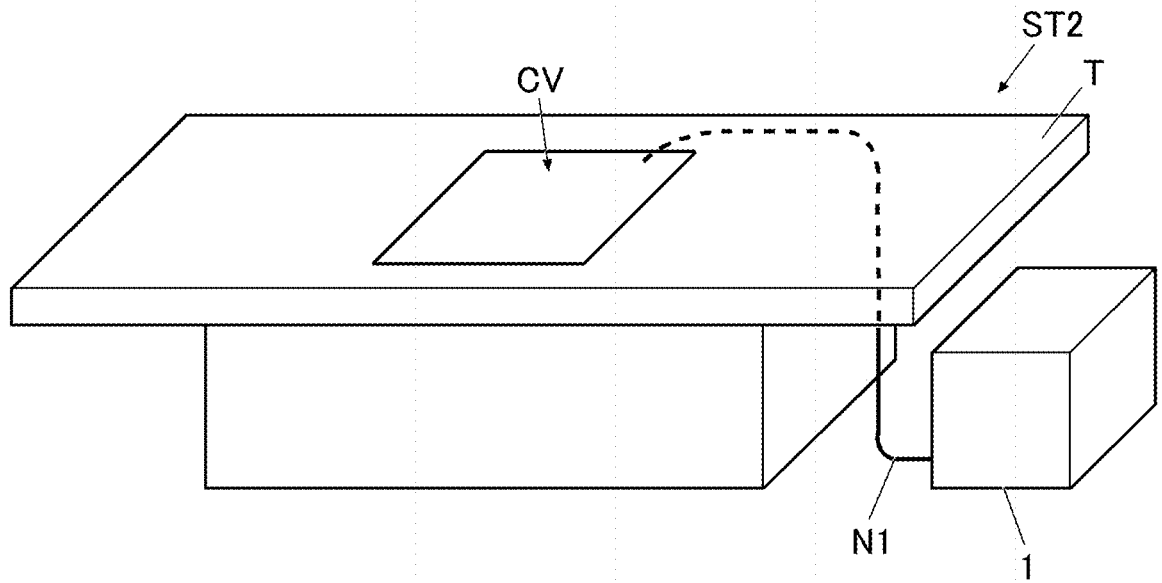
FIG. 13 is a schematic diagram (perspective view) of the DXA-compatible decubitus imaging table.

Furthermore, as illustrated in FIG. 13, after the radiation detector 2 is stored, a cover CV is attached to this space. Thus, a physical burden (such as back pain) on the patient due to the stepped portion of the top plate T is reduced. The cover CV can be attached even in a case where the radiation detector 2 is not stored. That is, when the AEC imaging is performed as the general imaging, the radiation detector 2 is stored in the first FPD space SP1. On the other hand, imaging is performed in a state in which the radiation detector 2 is not stored in the second FPD space SP2 and the cover is attached to the second FPD space SP2. In this manner, it is possible to prevent the radiation detector 2 of the second FPD space SP2 from appearing unexpectedly in the image.

Figure 14:
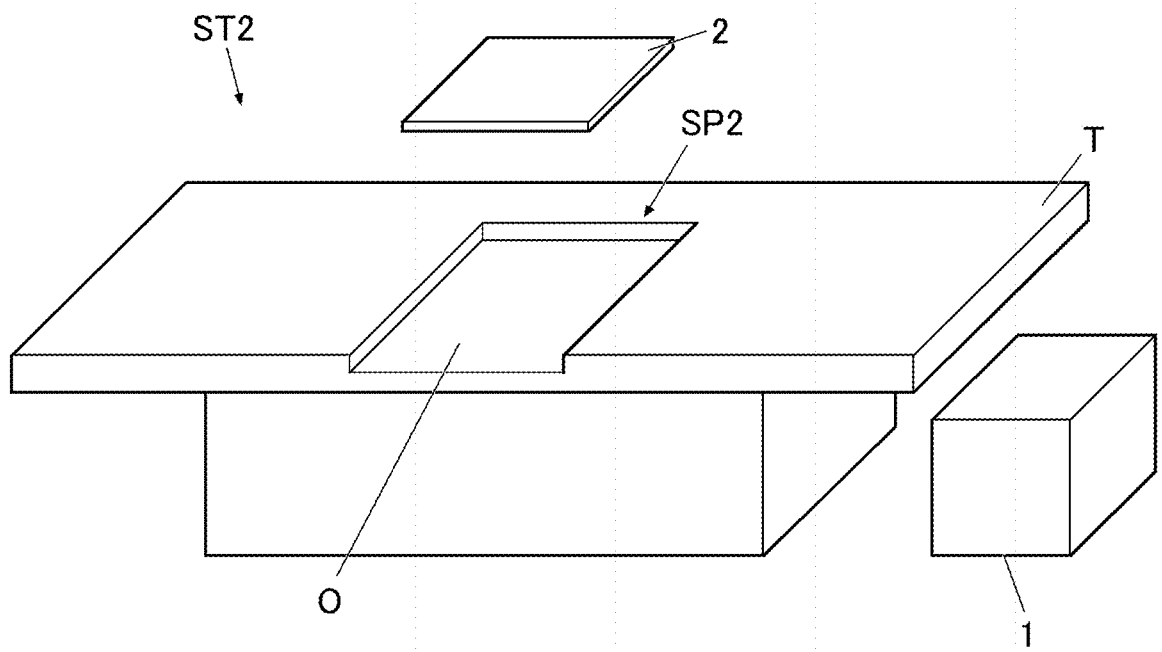
FIG. 14 is a schematic diagram (perspective view) of the DXA-compatible decubitus imaging table.
Figure 15:
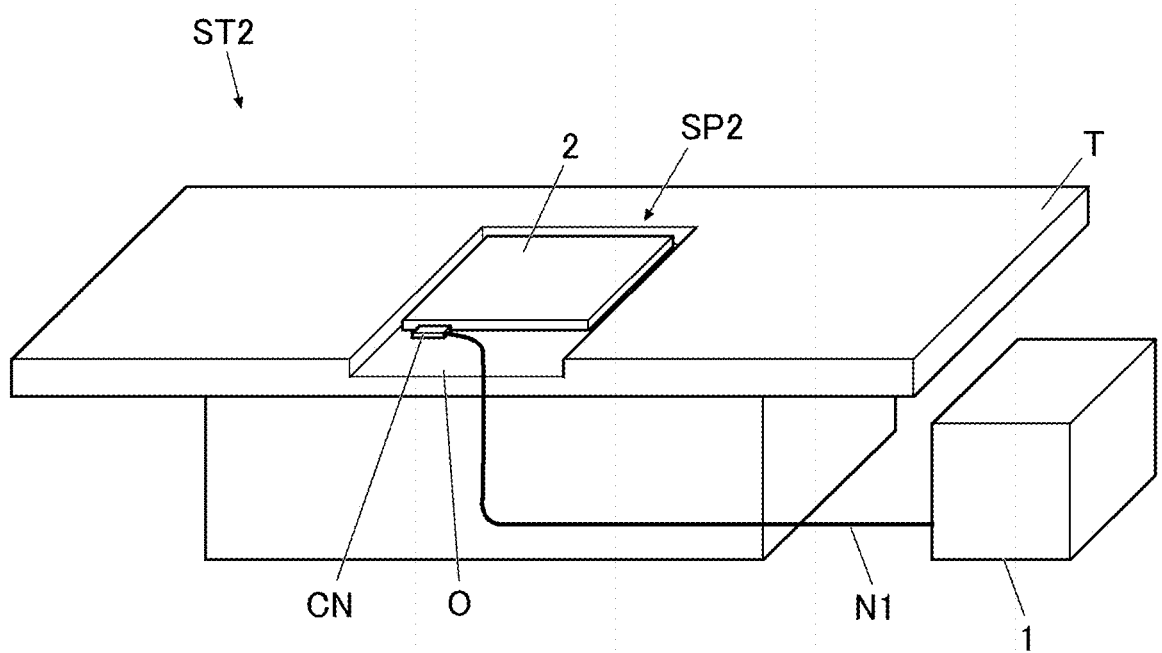
FIG. 15 is a schematic diagram (perspective view) of the DXA-compatible decubitus imaging table.
Figure 16:
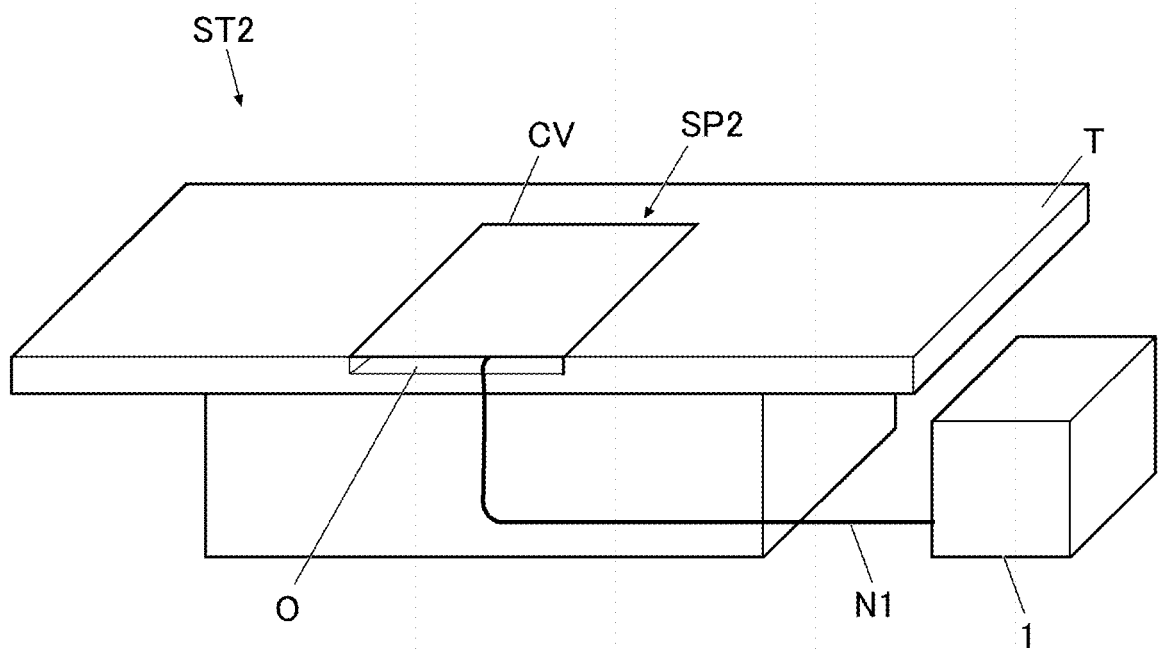
FIG. 16 is a schematic diagram (perspective view) of the DXA-compatible decubitus imaging table.

As shown in FIGS. 14, FIG. 15, and FIG. 16, all or a part of one side of the rectangular recess of the second FPD space SP2 may be opened from the edge of the top plate T. By doing so, the radiation detector 2 can be put in and out more easily than in the case of the rectangular recess. For example, the user can put the radiation detector 2 into the second FPD space SP2 from an open portion O at the edge of the top plate T in a state where the cover CV of the second FPD space SP2 is attached as illustrated in FIG. 16. That is, the user can put in and out the radiation detector 2 in a state in which the patient is placed on the top plate T. Therefore, convenience is enhanced. Further, the communication network/irradiation image generation synchronization timing common cable N1 may be routed through the open portion O. Therefore, the user can remove the cable N1 from the second FPD space SP2 when not using the second FPD space SP2. Thus, when the AEC imaging is performed in the general imaging, there is no need to worry about the cable appearing unexpectedly in the image.

Figure 17:
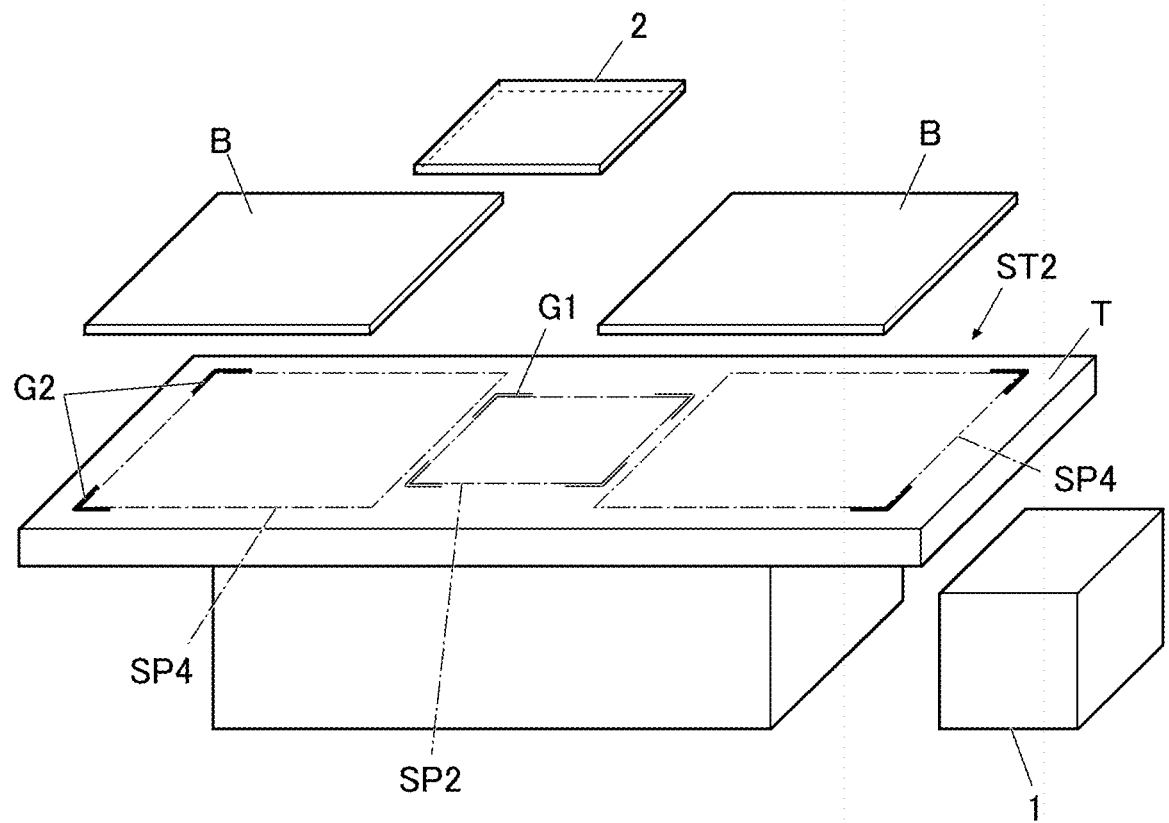
FIG. 17 is a schematic diagram (perspective view) of the DXA-compatible decubitus imaging table.

Further, as another configuration, the radiation detector 2 may be placed on the top plate T without providing the recess in the top plate T. In this case, the patient is directly placed on the top plate T when the general imaging is performed, but the radiation detector 2 is placed on the top plate T and the patient is placed thereon when the DXA imaging is performed. In this case, if the arrangement of the radiation detector 2 is shifted when the patient goes on the radiation detector 2 or due to a body motion of the patient during imaging, the arrangement becomes unsuitable for the DXA imaging, and the imaging may fail. Therefore, as illustrated in FIG. 17, the top plate T may be provided with a convex protrusion (FPD arrangement guide G1) that catches a side and/or a corner of the radiation detector 2. Accordingly, it is possible to prevent the misalignment of the radiation detector 2.

Figure 18:
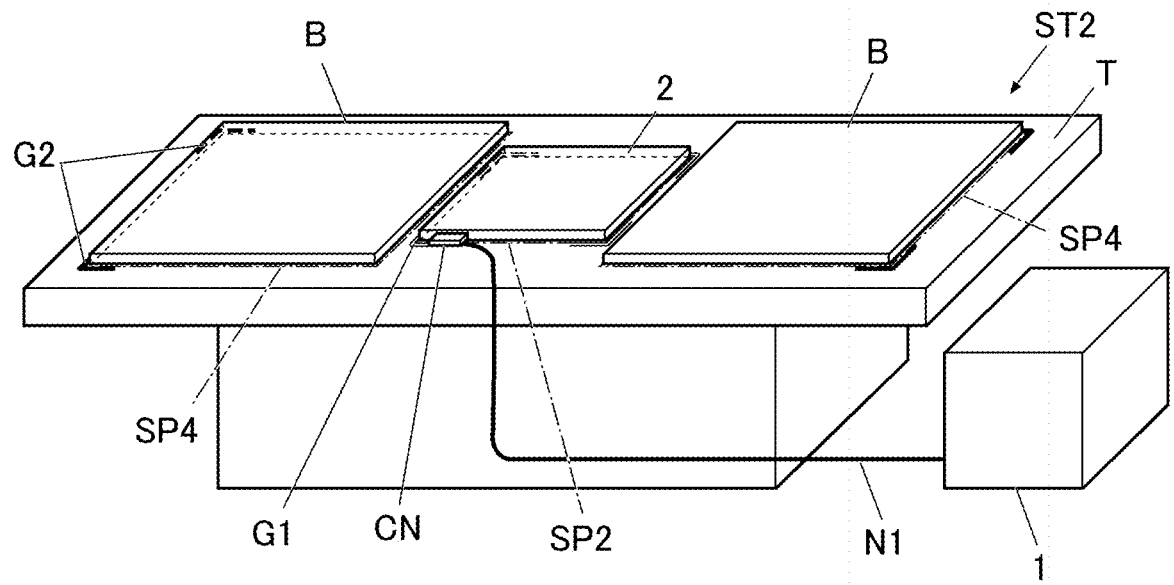
FIG. 18 is a schematic diagram (perspective view) of the DXA-compatible decubitus imaging table.

The FPD arrangement guide G1 is arranged so as to be caught by at least two or more (preferably four or more) sides and/or corners. When placing the radiation detector 2 on the top plate T, the person who performs the imaging aligns the FPD arrangement guide G1 with the side and/or the corner of the radiation detector 2. Thus, the radiation detector 2 can be arranged at a position suitable for the DXA imaging. Therefore, workability for the user is enhanced. In a case where the radiation detector 2 is arranged on the top plate T in this manner and the patient is placed thereon, the step of the radiation detector 2 leads to a physical burden on the patient. Therefore, as shown in FIG. 17, a lifting material B for eliminating the step may be disposed around the second FPD space SP2. The lifting material B is arranged in the lifting material arrangement space SP4. The lifting material arrangement space SP4 may be provided with a convex protrusion (lifting material arrangement guide G2) for the lifting material so that a part of the lifting material B is caught. Accordingly, in a case where the patient is positioned by being placed on the radiation detector 2 and the lifting material B, the arrangement of the lifting material B is prevented from being shifted (FIGS. 17 and 18). Therefore, a possibility that due to the shift of the arrangement of the lifting material B, the patient is unloaded to arrange the lifting material B again, and the positioning is performed again decreases.

If there are many lifting material arrangement guides G2 near the center of the top plate T, the patient feels a protrusion and a physical burden when the patient is directly placed on the top plate T at the time of general imaging. To avoid that, the lifting material arrangement guide is not arranged near the center of the top plate T. The raising material arrangement guide may be arranged around the side of the top plate T. Around the side of the top plate T is, for example, a region 10 cm to the inner side from the edge of the top plate T.

In addition, in a case where the FPD arrangement guide G1 and the lifting material arrangement guide G2 are provided, it is difficult for the user to understand which guide each of the radiation detector 2 and the lifting material B is to follow. Therefore, the shape and/or color of the FPD arrangement guide G1 and the lifting material arrangement guide G2 may be changed. Thus, the user can easily make the determination. Alternatively, an indication for determining whether each space is the FPD space, or the lifting material space may be attached to each space.

Providing the X-ray imaging system 100 with the DXA-compatible decubitus imaging table ST2 has been described above. However, the X-ray imaging system 100 may include a plurality of imaging tables S, some of which may be the DXA-compatible imaging tables described above, and the others may be the DXA-non-compatible imaging tables. In this case, if the DXA imaging is performed on the DXA-non-compatible imaging table, scattered radiation due to the AEC is generated. Therefore, a step may be added in the DXA imaging possibility determination processing. In that step, in a case where the imaging table selected by the person performing the imaging in the DXA imaging is the DXA-non-compatible imaging table, the controller 31 may issue the warning and/or prohibit exposure in steps S8 and S9. Alternatively, the condition that the DXA-compatible imaging table has been selected may be used as one of the DXA imaging permission conditions.

The DXA-compatible imaging table described above is affected by scattered radiation when the radiation detector 2 used for the DXA imaging is located in the first FPD space SP1. Therefore, the radiation detector 2 used for the DXA imaging needs to be arranged in the second FPD space SP2. In contrast, the X-ray imaging system 100 may have a mechanism that detects that the radiation detector 2 is disposed in the second FPD space SP2. In the DXA imaging possibility determination processing, a step may be added. At that step, if the radiation detector 2 is not placed in the second FPD space SP2 in the case of DXA imaging, the controller 31 may issue the warning and/or prohibit exposure in steps S8 and S9. Alternatively, the placement of the radiation detector 2 in the second FPD space SP2 may be used as one of the DXA imaging permission conditions. Furthermore, the X-ray imaging system 100 may be provided with a mechanism that can identify the individual or type of the radiation detector 2 placed in the second FPD space SP2. Even if the radiation detector 2 is disposed in the second FPD space, the controller 31 may issue the warning and/or prohibit exposure in steps S8 and S9 in the following cases. The cases may be a case in which the device itself or the type of the radiation detector 2 is not suitable for the DXA imaging or a case in which the device itself or the type of the radiation detector 2 is different from the radiation detector 2 selected by the person that performs the imaging. Alternatively, the fact that the radiation detector 2 is disposed in the second FPD space SP2 and the device itself or type of the radiation detector 2 is suitable for the DXA imaging or matches the radiation detector 2 selected by the person who performs the imaging may be used as one of the DXA imaging permission conditions.

In addition, the controller 31 may add a step in the DXA imaging possibility determination processing and may issue the warning and/or prohibit imaging when the grid loading state is different from the predetermined state. This is because whether or not the grid is loaded is optional by the user in the general imaging. However, in the DXA imaging, predetermined conditions are determined in advance, for example, a grid is not loaded, or the specification of the grid to be loaded is fixed, and then bone density is calculated. In this way, it is possible to avoid a situation in which imaging is performed under an unintended condition and in which a desired result of bone density cannot be obtained.

In addition, in the flowchart of FIG. 4, the DXA imaging possibility determination processing is performed in the order of S1 to S7, but the order is not necessarily the order of S1 to S7, and the order may be changed, or the determination may be performed at the same time.

(Imaging Support)

In a case where the collimator of the radiation generating apparatus 1 is used for the slit 13, the controller 31 may display the relationship between a target opening and a current opening. The display of the relationship between the target opening and the current opening can support the setting of the opening width in step S8. Since the irradiation area irradiated on the panel is determined by the opening width, it is necessary to match the opening width to a predetermined width in millimeters. It is difficult to visually adjust the opening width to a predetermined width. The display may be a display in which the relationship between the target opening and the current opening is expressed as a digital value or may be a digital display of only the current opening width. By doing so, the manual adjustment of the opening width can also be performed in millimeters.

Further, the controller 31 may calculate the positional information of the imaging system and the vertical and horizontal positional correction amounts to be at the center of the image from the image of the general imaging. The controller 31 may display, on the console 3 or another monitor placed near the patient, information on the position of the imaging system and vertical and horizontal position correction amounts by which the position should be at the center of the image. Thus, the position movement amount of the imaging system is visualized at the same time, which can support the alignment. The image imaged in the general imaging is the image of pre-imaging performed before the DXA imaging. Note that if the radiation imaging system 100 supports automatic positioning, the controller 31 may automatically perform alignment based on the position information. Accordingly, in a case in which a site required for the DXA imaging is not in a region of interest (ROI) in the still image acquired by the pre-imaging, positioning can be supported. In a case where a site necessary for the DXA imaging is not included in the ROI in the still image acquired by the pre-imaging, the bone density is not measured accurately. Therefore, positioning required for the DXA imaging can be supported using an image acquired in the pre-imaging.

Further, the controller 31 may display the image imaged in the previous occasion. For the follow-up observation of bone density, imaging is preferably performed under the same conditions as those of the last time. The same condition is, that is, the same positioning. By displaying the previously imaged image, the user can recognize the difference in positioning between the previous imaging and the current imaging and finely correct the positioning state.

In addition, if there is bending of the lumbar spine or the like, the controller 31 may call attention to positioning. For example, the controller 31 may calculate the vertical and horizontal position correction amounts and display them on the console. Depending on the state of the patient such as bending of the lumbar spine, positioning in consideration of the state is necessary. Therefore, prompting the user to pay attention can reduce the risk of failure in imaging due to positioning. Further, by calculating and displaying the position correction amount for reproducing the positioning at the time of the previous imaging, the user can intuitively and finely correct the positioning.

Furthermore, the controller 31 may display a status and an instruction for imaging in a manner that is easy for the person performing the imaging to understand. For example, the controller 31 graphically displays whether the current path is forward or backward, changes the sound during imaging, changes the color of the LED, or displays the remaining time until the imaging is completed. The imaging involving the forward path, the backward path, and the movement of the tube is not necessarily a typical method. Therefore, it is assumed that the person performing the imaging forgets that there is a return path and releases the exposure switch to stop irradiation. In addition, a case is assumed in which the person performing the imaging forgets whether the current path is the forward path or the backward path during the imaging. By doing as described above, it is possible to cause the user to intuitively recognize the current imaging state and to reduce the risk of imaging failure due to misunderstanding of the user.

(Device Configuration)

In some cases, the controller 31 needs to control the tube voltage kV, the tube current, and the tube current-time product mAs value with high accuracy equal to or higher than the specification of the radiation generating apparatus 1. Therefore, the radiation source 11 may include a dosimeter. The radiation generating apparatus 1 may transmit dose information. The console 3 may receive dose information from a dosimeter or the radiation generating apparatus 1 and correct variations in signal values on an image due to variations in dose. In many cases, the radiation generating apparatus 1 cannot perform irradiation with accuracy required in DXA imaging. However, by doing so, an effect equivalent to irradiation with the same dose can be obtained. Note that as an alternative to information of a dosimeter, the above may be performed based on dose information output by the radiation generating apparatus 1.

In addition, the controller 31 may derive a source skin distance (SSD) by a visible light camera and/or a ranging sensor (ranging camera) attached to the tube (radiation source 11). The SSD is the distance from the tube focus to the surface of the subject H. For example, the controller 31 may calculate the body thickness by subtracting the SSD from the SID acquired from the mechanical arrangement information of the radiation generating apparatus 1. The controller 31 may use the calculated body thickness for scattered radiation correction. For example, in a case where the body thickness is large, it is necessary to increase the dose, and as a result, the scattered rays also increase, and therefore, it is necessary to correct the signal due to the scattered rays. Further, the SSD may be used for automatic derivation of the imaging condition.

(Console)

In addition, since the controller 31 controls the general imaging and the DXA imaging, the controller 31 may enable the general imaging and the DXA imaging in the same examination and may manage the imaged images in association with each other. Usually, the still image imaging (general imaging) is performed before the DXA imaging. Therefore, when the above imaging are grouped and managed as the same examination, subsequent management of images and examinations on the user side becomes smooth.

Furthermore, the controller 31 may display that the DXA imaging mode is being used on the display part 34 of the console 3 in order to properly inform the user which imaging mode is currently being used. In a case where the general imaging and the DXA imaging are continuously performed, there may be a situation that the imaging mode is not switched. Situations that can be assumed include, for example, a delay in the workflow occurs because imaging preparation was completed but imaging could not be started. However, by displaying the imaging mode, the user can intuitively recognize the current imaging, and can perform efficient imaging without having to go back steps in the operation.

In addition, the controller 31 may switch whether wireless communication is allowed in the general imaging and the DXA imaging. The DXA imaging consumes more power than the general imaging. Therefore, in the DXA imaging, a method of performing imaging while supplying power to the panel by wired imaging is preferable. In the DXA imaging, it is preferable to perform communication or image transfer using wired communication with a high transfer speed. For this reason, since it is not necessary to perform the wireless setting in the DXA imaging, for example, control that does not permit the switching to the wireless communication during the DXA imaging may be added to the processing. In general imaging, switching to wireless communication may be possible. According to the above, it is possible to always perform imaging in a state where system performance is optimal depending on the imaging mode.

Further, the controller 31 may change the processing parameter of the scattered radiation correction based on the type information of the imaging table S to be used. For example, the controller 31 may use different parameters depending on the type of the table T of the imaging table S, the distance from the table T to the FPD, and the like.

(Pre-Imaging)

In addition, from the viewpoint of preventing unnecessary DXA imaging, the controller 31 may perform still image imaging (pre-imaging) after positioning for the DXA and determine whether or not imaging is possible. For example, the controller 31 determines that the DXA imaging cannot be performed by image recognition from the image of the preliminary imaging among the still image acquired by the preliminary imaging. For example, the controller 31 determines that the DXA imaging cannot be performed for a reason that the site required for the DXA imaging is not included in the ROI. The controller 31 notifies from the console that the DXA imaging cannot be performed. By doing so, the user can understand an inappropriate state before starting the DXA imaging, and it is possible to prevent wasteful DXA imaging. The inappropriate state is, for example, a state related to positioning of the patient.

Further, the controller 31 may evaluate the reproducibility of the positioning by comparing the pre-imaging image at the time of the previous DXA imaging with the current pre-imaging image. From the viewpoint of follow-up observation, the reproducibility of positioning is important.

In addition, the controller 31 may estimate the body thickness of the site in the still image of the pre-imaging and adjust the dose at the time of DXA imaging. The site is a lumbar vertebra, a femur, or the like. For example, the controller 31 defines three ranges of large, medium, and small in the body thickness. The controller 31 defines imaging conditions corresponding to the respective ranges in association with each other, and automatically adjusts the dose from the body thickness obtained by the body thickness estimation. The imaging conditions are, for example, a tube voltage kV and a tube current-time product mAs. In this way, it is possible to perform the DXA imaging under an appropriate imaging condition according to the body shape of the patient without depending on the determination of the user.

In addition, the controller 31 may derive a range in which irradiation is necessary from the pre-imaging image and determine the movement range of the tube from the range. For example, in the DXA imaging, a portion to be included in the imaging range is indicated by a guideline or the like for each measurement site such as the lumbar vertebra or femur. It is conceivable that the controller 31 determines a range that needs to be irradiated with light including at least these portions and adding a certain margin. By doing so, it is possible to always perform imaging in the optimum irradiation range without depending on the positioning state of the patient, and it is possible to omit the user's operation of determining the irradiation range. Note that in a case where the preliminary imaging is not performed, the entire panel may be set as the moving range. In addition, the controller 31 may determine a range in which irradiation is necessary from the structure of the subject. Further, the controller 31 may set a range that needs to be irradiated as an irradiation field for pre-imaging. In addition, the range that needs to be irradiated may be indicated on the screen by the user.

Further, the controller 31 may derive the imaging range of DXA from the opening width of the collimator and the SID information and may determine the movement range of the tube on the basis of the imaging range.

Further, the controller 31 may index the irradiation field from the tube camera and determine the movement range of the tube. The tube camera is a camera provided in the radiation source 11.

(During Imaging)

Further, the controller 31 may update the dark image for offset correction at the time of forward path/backward path reversal.

The controller 31 may switch afterimage correction between the forward path and the return path simultaneously with offset image update.

(Effect and the Like)

As described above, the X-ray imaging system (radiation imaging system 100) is an X-ray imaging system capable of performing X-ray imaging by the dual-energy X-ray absorptiometry and general imaging, and includes an X-ray irradiation apparatus (radiation generating apparatus 1) capable of individually emitting a plurality of X-rays with different energies, a portable X-ray detector (radiation detector 2) that images an X-ray image based on the X-rays emitted from the X-ray irradiation apparatus, and an X-ray imaging control apparatus (console 3) that controls the imaging of the X-ray image by the X-ray detector. The X-ray imaging control apparatus (console 3) includes a determination section (controller 31) that determines whether or not the type of the X-ray detector is suitable for X-ray imaging by the dual-energy X-ray absorptiometry, and a notification section (display part 34) that performs a notification based on the determination result of the determination section. Accordingly, it is possible to prevent imaging using the DXA method in a state not suitable for imaging using the DXA method and to prevent unnecessary exposure of the subject.

The X-ray imaging system (radiation imaging system 100) is an X-ray imaging system capable of performing X-ray imaging by a dual-energy X-ray absorptiometry and general imaging, and includes an X-ray irradiation apparatus (radiation generating apparatus 1) that individually emits a plurality of X-rays with different energies, a portable X-ray detector (radiation detector 2) that images an X-ray image based on the X-rays emitted by the X-ray irradiation apparatus, and an X-ray imaging control apparatus (console 3) that controls the imaging of the X-ray image by the X-ray detector. The X-ray imaging control apparatus (console 3) includes a determination section (controller 31) that determines whether or not an apparatus state of the X-ray irradiation apparatus is suitable for the X-ray imaging by the dual-energy X-ray absorptiometry, and a notification section (display part 34) that performs a notification based on a determination result of the determination section. Accordingly, it is possible to prevent imaging using the DXA method in a state not suitable for imaging using the DXA method and to prevent unnecessary exposure of the subject.

The X-ray imaging system (radiation imaging system 100) is an X-ray imaging system capable of performing X-ray imaging by a dual-energy X-ray absorptiometry and general imaging, and includes an X-ray irradiation apparatus (radiation generating apparatus 1) that individually emits a plurality of X-rays with different energies, a portable X-ray detector (radiation detector 2) that images an X-ray image based on the X-rays emitted from the X-ray irradiation apparatus, and an X-ray imaging control apparatus (console 3) that controls the imaging of the X-ray image by the X-ray detector. The X-ray imaging control apparatus (console 3) includes a determination section (controller 31) that determines whether or not the irradiation conditions of the X-ray irradiation apparatus are suitable for the X-ray imaging using the dual-energy X-ray absorptiometry, and a notification section (display part 34) that performs a notification based on the determination result of the determination section. Accordingly, it is possible to prevent imaging using the DXA method in a state not suitable for imaging using the DXA method and to prevent unnecessary exposure of the subject.

In addition, the X-ray irradiation apparatus (radiation generating apparatus 1) performs X-ray imaging by a dual energy X-ray absorptiometry by a plurality of times of irradiation. Thus, it is possible to prevent the influence of scattered radiation from increasing and affecting the accuracy of bone density when the imaging range is exposed at one time. That is, the influence of scattered radiation can be reduced by narrowing the irradiation range using the slit and performing exposure a plurality of times.

The plurality of irradiations are performed at least at different tube voltages. In other words, the plurality of irradiations are irradiations of X-rays of two different types of energy, high energy and low energy. This makes it possible to distinguish between bone and soft tissue.

The type of the X-ray detector (radiation detector 2) is the size, function, or performance of the X-ray detector, and the notification section (display part 34) notifies when the size, function, or performance of the X-ray detector is not the size, function, or performance suitable for X-ray imaging by the dual-energy X-ray absorptiometry. Accordingly, it is possible to prevent imaging using the DXA method in a state not suitable for imaging using the DXA method and to prevent unnecessary exposure of the subject.

The X-ray imaging control apparatus (console 3) includes a first prohibition section (controller 31) that prohibits imaging in a case where the size, function, or performance of the X-ray detector is not the size, function, or performance suitable for the X-ray imaging by the dual energy X-ray absorptiometry. Accordingly, it is possible to prevent imaging using the DXA method in a state not suitable for imaging using the DXA method and to prevent unnecessary exposure of the subject.

When the slit and/or the K-edge filter for narrowing the X-ray irradiation range is not suitable for the DXA imaging, the determination section determines that the slit and/or the K-edge filter is not suitable for the X-ray imaging by the dual-energy X-ray absorptiometry. Accordingly, it is possible to prevent imaging using the DXA method in a state not suitable for imaging using the DXA method and to prevent unnecessary exposure of the subject.

In addition, the X-ray imaging control apparatus includes a second prohibition section (controller 31) that prohibits imaging when the slit and/or the K edge filter for narrowing the irradiation range of X-rays is not suitable for the DXA imaging. Accordingly, it is possible to prevent imaging using the DXA method in a state not suitable for imaging using the DXA method and to prevent unnecessary exposure of the subject.

Further, the slit and the filter are externally attached to the X-ray irradiation apparatus. Thus, when DXA imaging is added as an option to a general imaging apparatus later, even in a case where these mechanisms cannot be provided in the tube, they can be provided externally.

The irradiation condition includes one of the distance to the object and the tube voltage. Thus, the bone density over time can be appropriately measured. Since the bone density examination measures a subtle change of a subject over time, it is desirable to fix imaging conditions such as the SID and the tube voltage. Therefore, unnecessary exposure of the subject can be prevented by not permitting imaging when the SID or the tube voltage is out of the condition defined as DXA imaging.

Further, the irradiation condition is a distance between the X-ray irradiation apparatus and the object, and the discrimination section discriminates that the X-ray imaging apparatus is not suitable for X-ray imaging by the dual energy X-ray absorptiometry in a case in which the distance is out of a predetermined range. Accordingly, it is possible to prevent imaging using the DXA method in a state not suitable for imaging using the DXA method and to prevent unnecessary exposure of the subject.

Further, the X-ray imaging control apparatus includes a third prohibition section (controller 31) that prohibits imaging when the distance is out of the predetermined range. Accordingly, it is possible to prevent imaging using the DXA method in a state not suitable for imaging using the DXA method and to prevent unnecessary exposure of the subject.

In addition, the X-ray imaging method is an X-ray imaging method using an X-ray imaging system (radiation imaging system 100) that includes an X-ray irradiation apparatus (radiation generating apparatus 1) capable of individually emitting a plurality of X-rays having different energies, a portable X-ray detector (radiation detector 2) that images an X-ray image based on the X-rays emitted from the X-ray irradiation apparatus, and an X-ray imaging control apparatus (console 3) that controls the capture of the X-ray image by the X-ray detector and is capable of performing X-ray imaging by a dual-energy X-ray absorptiometry and general imaging. The X-ray imaging method includes a determination step of determining whether or not the type of the X-ray detector is suitable for X-ray imaging by the dual-energy X-ray absorptiometry, and a notification step of performing notification based on the determination result of the determination section. Accordingly, it is possible to prevent imaging using the DXA method in a state not suitable for imaging using the DXA method and to prevent unnecessary exposure of the subject.

The X-ray imaging method is an X-ray imaging method using an X-ray imaging system (radiation imaging system 100) that includes an X-ray irradiation apparatus (radiation generating apparatus 1) capable of individually emitting a plurality of X-rays having different energies, a portable X-ray detector (the radiation detector 2) for imaging an X-ray image based on the X-rays emitted by the X-ray irradiation apparatus, and an X-ray imaging control apparatus (the console 3) for controlling the imaging of the X-ray image by the X-ray detector and that is capable of performing X-ray imaging by dual-energy X-ray absorptiometry and general imaging. The X-ray imaging method includes a determination step of determining whether an apparatus state of the X-ray irradiation apparatus is suitable for X-ray imaging by the dual energy X-ray absorptiometry, and a notification step of providing a notification based on a determination result of the determination section. Accordingly, it is possible to prevent imaging using the DXA method in a state not suitable for imaging using the DXA method and to prevent unnecessary exposure of the subject.

The X-ray imaging method is an X-ray imaging method using an X-ray imaging system (radiation imaging system 100) that includes an X-ray irradiation apparatus (radiation generating apparatus 1) capable of individually emitting a plurality of X-rays having different energies, a portable X-ray detector (the radiation detector 2) for imaging an X-ray image based on the X-rays emitted by the X-ray irradiation apparatus, and an X-ray imaging control apparatus (console 3) for controlling the imaging of the X-ray image by the X-ray detector and that is capable of performing X-ray imaging by dual-energy X-ray absorptiometry and general imaging. The X-ray imaging method includes a determination step of determining whether or not an irradiation condition of the X-ray irradiation apparatus is suitable for X-ray imaging by the dual-energy X-ray absorptiometry, and a notification step of performing notification based on a determination result of the determination section. Accordingly, it is possible to prevent imaging using the DXA method in a state not suitable for imaging using the DXA method and to prevent unnecessary exposure of the subject.

Furthermore, the program is used in an X-ray imaging control apparatus included in the X-ray imaging system (radiation imaging system 100) that includes the X-ray irradiation apparatus (radiation generating apparatus 1) capable of individually emitting a plurality of X-rays having different energies, the portable X-ray detector (the radiation detector 2) for imaging an X-ray image based on the X-rays emitted by the X-ray irradiation apparatus, and the X-ray imaging control apparatus (the console 3) for controlling the imaging of the X-ray image by the X-ray detector, and that is capable of performing X-ray imaging by dual-energy X-ray absorptiometry and general imaging. The program causes the computer of the X-ray imaging control apparatus to function as a determination section that determines whether or not the type of the X-ray detector is suitable for X-ray imaging by the dual-energy X-ray absorptiometry, and a notification section that performs notification based on the determination result of the determination section. Accordingly, it is possible to prevent imaging using the DXA method in a state not suitable for imaging using the DXA method and to prevent unnecessary exposure of the subject.

Furthermore, the program is used in the X-ray imaging control apparatus included in the X-ray imaging system (radiation imaging system 100) that includes the X-ray irradiation apparatus (the radiation generating apparatus 1) capable of individually emitting a plurality of X-rays having different energies, the portable X-ray detector (the radiation detector 2) for imaging an X-ray image based on the X-rays emitted by the X-ray irradiation apparatus, and the X-ray imaging control apparatus (the console 3) for controlling the imaging of the X-ray image by the X-ray detector, and that is capable of performing X-ray imaging by dual-energy X-ray absorptiometry and general imaging. The program causes the computer of the X-ray imaging control apparatus to function as a determination section that determines whether or not the apparatus state of the X-ray irradiation apparatus is suitable for X-ray imaging by the dual-energy X-ray absorptiometry, and a notification section that performs notification based on the determination result of the determination section. Accordingly, it is possible to prevent imaging using the DXA method in a state not suitable for imaging using the DXA method and to prevent unnecessary exposure of the subject.

Furthermore, the computer-readable program stored in the non-transitory recording medium is used in the X-ray imaging control apparatus included in the X-ray imaging system (radiation imaging system 100) capable of performing X-ray imaging by dual-energy X-ray absorptiometry and general imaging, which includes the X-ray irradiation apparatus (radiation generating apparatus 1) capable of individually emitting a plurality of X-rays having different energies, the portable X-ray detector (radiation detector 2) for imaging an X-ray image based on the X-rays emitted by the X-ray irradiation apparatus, and the X-ray imaging control apparatus (console 3) for controlling the imaging of the X-ray image by the X-ray detector. The program causes the computer of the X-ray imaging control apparatus to function as a determination section that determines whether or not the irradiation condition of the X-ray irradiation apparatus is suitable for X-ray imaging by the dual-energy X-ray absorptiometry, and a notification section that performs notification based on the determination result of the determination section. Accordingly, it is possible to prevent imaging using the DXA method in a state not suitable for imaging using the DXA method and to prevent unnecessary exposure of the subject.

The X-ray imaging control apparatus (console 3) is an X-ray imaging control apparatus (console 3) in the X-ray imaging system (radiation imaging system 100) capable of performing X-ray imaging using a dual energy X-ray absorptiometry and general imaging, including an X-ray irradiation apparatus (radiation generating apparatus 1) capable of individually emitting a plurality of X-rays with different energy levels, a portable X-ray detector (radiation detector 2) that images an X-ray image based on the X-rays emitted from the X-ray irradiation apparatus, and the X-ray imaging control apparatus (console 3) that controls the imaging of the X-ray image by the X-ray detector. The X-ray imaging control apparatus (console 3) includes a determination section (controller 31) that determines whether the type of the X-ray detector is suitable for X-ray imaging by the dual-energy X-ray absorptiometry, and a notification section (display part 34) that performs notification based on the determination result of the determination section. Accordingly, it is possible to prevent imaging using the DXA method in a state not suitable for imaging using the DXA method and to prevent unnecessary exposure of the subject.

The X-ray imaging control apparatus (console 3) is an X-ray imaging control apparatus (console 3) in the X-ray imaging system (radiation imaging system 100) capable of performing X-ray imaging using a dual energy X-ray absorptiometry and general imaging, including an X-ray irradiation apparatus (radiation generating apparatus 1) capable of individually emitting a plurality of X-rays with different energies, a portable X-ray detector (radiation detector 2) that images an X-ray image based on the X-rays emitted from the X-ray irradiation apparatus, and the X-ray imaging control apparatus (console 3) that controls the imaging of the X-ray image by the X-ray detector. The X-ray imaging control apparatus (console 3) includes a determination section (controller 31) that determines whether the apparatus state of the X-ray irradiation apparatus is suitable for the X-ray imaging by the dual-energy X-ray absorptiometry, and a notification section (display part 34) that performs notification based on the determination result of the determination section. Accordingly, it is possible to prevent imaging using the DXA method in a state not suitable for imaging using the DXA method and to prevent unnecessary exposure of the subject.

The X-ray imaging control apparatus (console 3) is an X-ray imaging control apparatus (console 3) in the X-ray imaging system (radiation imaging system 100) capable of performing X-ray imaging using a dual energy X-ray absorptiometry and general imaging, including an X-ray irradiation apparatus (radiation generating apparatus 1) capable of individually emitting a plurality of X-rays with different energies, a portable X-ray detector (radiation detector 2) that images an X-ray image based on the X-rays emitted from the X-ray irradiation apparatus, and the X-ray imaging control apparatus (console 3) that controls the imaging of the X-ray image by the X-ray detector. The X-ray imaging control apparatus (console 3) includes a determination section (controller 31) that determines whether or not the irradiation condition of the X-ray irradiation apparatus is suitable for X-ray imaging by the dual-energy X-ray absorptiometry, and a notification section (display part 34) that performs notification based on the determination result of the determination section. Accordingly, it is possible to prevent imaging using the DXA method in a state not suitable for imaging using the DXA method and to prevent unnecessary exposure of the subject.

Although the present invention has been specifically described based on the embodiments, the present invention is not limited to the above-described embodiments and can be modified without departing from the scope of the invention.

For example, in the above-described embodiment, the console 3 has the function of executing the above-described processing at the time of imaging. However, another apparatus included in the radiation imaging system 100 or another system connected to the radiation imaging system 100 may be provided with the function of executing the processing at the time of imaging or the function of executing a part thereof.

Further, the present invention provides an X-ray imaging system capable of performing the X-ray imaging by the dual-energy X-ray absorptiometry and the general imaging. However, imaging functions other than these two functions (for example, a fluoroscopic imaging function, a dynamic imaging function, tomosynthesis, DES, and a long length imaging function) may be provided. In addition, for example, a DXA imaging apparatus by a fluoroscopic apparatus may be used.

Furthermore, the above description discloses an example in which a semiconductor memory or a hard disk is used as a computer-readable medium for a program according to the present invention. However, the present invention is not limited to this example.

As other computer-readable media, a nonvolatile memory such as a flash memory and a portable recording medium such as a CD-ROM can be applied.

As a medium for providing data of the program according to the present invention via a communication line, a carrier wave is also applied to the present invention.

Although some embodiments of the present invention have been described, the scope of the present invention is not limited to the above-described embodiments and includes the scope of the invention described in the claims and its equivalent scope.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An X-ray imaging system capable of performing X-ray imaging by a dual-energy X-ray absorptiometry and general imaging, the X-ray imaging system comprising:
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not a type of the X-ray detector is suitable for X-ray imaging by the dual-energy X-ray absorptiometry, and
a notification section configured to perform notification based on a determination result of the hardware processor.

2. An X-ray imaging system capable of performing X-ray imaging by a dual-energy X-ray absorptiometry and general imaging, the X-ray imaging system comprising:
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not an apparatus state of the X-ray irradiation apparatus is suitable for X-ray imaging by the dual-energy X-ray absorptiometry, and
a notification section configured to perform notification based on a determination result of the hardware processor.

3. An X-ray imaging system capable of performing X-ray imaging by a dual-energy X-ray absorptiometry and general imaging, the X-ray imaging system comprising:
an X-ray irradiation apparatus capable of individually irradiating a plurality of X-rays having different energies,
a portable X-ray detector that images an X-ray image based on the X-rays emitted from the X-ray irradiation apparatus; and
an X-ray imaging control apparatus that controls imaging of the X-ray image by the X-ray detector,
wherein the X-ray imaging control apparatus includes,
a hardware processor that determines whether or not an irradiation condition of the X-ray irradiation apparatus is suitable for X-ray imaging by the dual-energy X-ray absorptiometry, and
a notification section configured to perform notification based on a determination result of the hardware processor.

4. The X-ray imaging system according to claim 1, wherein the X-ray irradiation apparatus performs X-ray imaging by a dual-energy X-ray absorptiometry by performing irradiation a plurality of times.

5. The X-ray imaging system according to claim 4, wherein the plurality of irradiations is performed at least at different tube voltages.

6. The X-ray imaging system according to claim 1,
wherein the type of the X-ray detector is a size, a function or a performance of the X-ray detector, and
wherein the notification section performs notification when the size, the function, or the performance of the X-ray detector is not the size, the function, or the performance suitable for the X-ray imaging by the dual-energy X-ray absorptiometry.

7. The X-ray imaging system according to claim 6, wherein the hardware processor of the X-ray imaging control apparatus prohibits imaging when the size, the function, or the performance of the X-ray detector is not the size, the function, or the performance suitable for the X-ray imaging by the dual-energy X-ray absorptiometry.

8. The X-ray imaging system according to claim 2, wherein the hardware processor determines that a slit and/or a filter that narrows an X-ray irradiation range is not suitable for the X-ray imaging by the dual energy X-ray absorptiometry.

9. The X-ray imaging system according to claim 8, wherein the hardware processor of the X-ray imaging control apparatus prohibits imaging when the slit and/or the filter for narrowing the X-ray irradiation range is not suitable for X-ray imaging by the dual-energy X-ray absorptiometry.

10. The X-ray imaging system according to claim 8, wherein the slit and the filter that narrow the X-ray irradiation range are externally attached to the X-ray irradiation apparatus.

11. The X-ray imaging system according to claim 3, wherein the irradiation condition includes one of a distance to an object and a tube voltage.

12. The X-ray imaging system according to claim 3,
wherein the irradiation condition is a distance between the X-ray irradiation apparatus and an object, and
wherein the hardware processor determines that it is not suitable for the X-ray imaging by the dual-energy X-ray absorptiometry when the distance is out of a predetermined range.

13. The X-ray imaging system according to claim 12, wherein the hardware processor of the X-ray imaging control apparatus prohibits imaging when the distance is out of a predetermined range.

14. An X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method comprising:
determining whether or not a type of the X-ray detector is suitable for X-ray imaging by the dual-energy X-ray absorptiometry, and
notifying to perform notification based on a determination result of the determining.

15. An X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method comprising:
determining whether or not an apparatus state of the X-ray irradiation apparatus is suitable for X-ray imaging by the dual-energy X-ray absorptiometry, and
notifying to perform notification based on a determination result of the determining.

16. An X-ray imaging method used in an X-ray imaging system capable of performing X-ray imaging by a dual-energy X-ray absorptiometry and general imaging, the X-ray imaging system including, an X-ray irradiation apparatus capable of individually irradiating a plurality of X-rays having different energies; a portable X-ray detector that images an X-ray image based on the X-rays emitted from the X-ray irradiation apparatus; and an X-ray imaging control apparatus that controls imaging of the X-ray image by the X-ray detector, the method comprising:
determining whether or not an irradiation condition of the X-ray irradiation apparatus is suitable for X-ray imaging by the dual-energy X-ray absorptiometry, and
notifying to perform notification based on a determination result of the determining.

\* \* \* \* \*